United States Patent
Karantzis

(10) Patent No.: US 12,099,585 B2
(45) Date of Patent: Sep. 24, 2024

(54) REMOTELY VERIFYING AN IDENTITY OF A PERSON

(71) Applicant: ISX IP Ltd, Strovolos (CY)

(72) Inventor: Nickolas John Karantzis, East Melbourne (AU)

(73) Assignee: ISX IP Ltd, Strovolos (CY)

( * ) Notice: Subject to any disclaimer, the term of this patent is extended or adjusted under 35 U.S.C. 154(b) by 481 days.

(21) Appl. No.: 17/275,361

(22) PCT Filed: Sep. 12, 2019

(86) PCT No.: PCT/AU2019/050981
§ 371 (c)(1),
(2) Date: Mar. 11, 2021

(87) PCT Pub. No.: WO2020/051643
PCT Pub. Date: Mar. 19, 2020

(65) Prior Publication Data
US 2022/0050890 A1 Feb. 17, 2022

(30) Foreign Application Priority Data

Sep. 12, 2018 (AU) .............................. 2018903424
Sep. 17, 2018 (AU) .............................. 2018903492

(51) Int. Cl.
*G06F 21/32* (2013.01)
*G06F 21/35* (2013.01)
(Continued)

(52) U.S. Cl.
CPC .............. *G06F 21/32* (2013.01); *G06F 21/35* (2013.01); *G06F 21/40* (2013.01); *G06V 30/153* (2022.01);
(Continued)

(58) Field of Classification Search
None
See application file for complete search history.

(56) References Cited

U.S. PATENT DOCUMENTS 10,771,850 B2 * 9/2020 Zhao .................. H04N 21/4826
2003/0217294 A1 11/2003 Kyle
(Continued)

FOREIGN PATENT DOCUMENTS

WO 01/78021 A2 10/2001

OTHER PUBLICATIONS

Nosseir et al. (Automatic extraction of Arabic Number from Egyptian ID card, ICSIE '18, May 2-4, 2018, p. 56-61 (Year: 2018).*
(Continued)

*Primary Examiner* — Randolph I Chu
(74) *Attorney, Agent, or Firm* — Kilpatrick Townsend & Stockton LLP

(57) ABSTRACT

A computer-implemented method for remotely verifying an identity of a user is presented. The method comprises a first data processing device (120) receiving a live video stream (102) of the user from a second data processing device (140) via a video data connection (108) having a video bandwidth. Establishing a separate data connection (110) between the first (120) and second (140) data processing devices, the data connection (110) having a data bandwidth. The first data processing device (120) receiving, via the data connection (110), identifying data (104) captured from an identifying means from the second data processing device (140), or another data processing device. The first data processing device (120) determining first biometric data based on the identifying data (104) and comparing to second biometric data based on the live video stream (102). The first data processing device (120) then verifying an identity of the user
(Continued)

based on a correspondence between the first biometric data and the second biometric data.

19 Claims, 8 Drawing Sheets

(51) Int. Cl.
G06F 21/40 (2013.01)
G06V 30/10 (2022.01)
G06V 30/148 (2022.01)

(52) U.S. Cl.
CPC ...... *G06F 2221/2121* (2013.01); *G06V 30/10* (2022.01)

(56) References Cited

U.S. PATENT DOCUMENTS

| | | |
|---|---|---|
| 2004/0190528 A1 | 9/2004 | Dacosta |
| 2006/0161791 A1* | 7/2006 | Bennett .............. G06F 21/40 713/193 |
| 2007/0012760 A1 | 1/2007 | Errato et al. |
| 2010/0313236 A1 | 12/2010 | Straub |
| 2011/0162013 A1 | 6/2011 | Bagasra et al. |
| 2013/0219480 A1* | 8/2013 | Bud .............. H04N 23/56 726/7 |
| 2016/0335423 A1* | 11/2016 | Beals .............. H04L 12/2803 |
| 2018/0048864 A1 | 2/2018 | Taylor et al. |
| 2020/0084057 A1* | 3/2020 | Wadhwa ............ H04M 3/563 |
| 2020/0162796 A1* | 5/2020 | Azuolas .............. H04L 65/65 |
| 2022/0050890 A1* | 2/2022 | Karantzis .............. G06F 21/32 |

OTHER PUBLICATIONS

Klonovs et al. (ID Proof on the Go, Mar. 2013 | IEEE vehicular technology magazine). (Year: 2013).*

International Search Report and Written Opinion for PCT/AU2019/050981 dated Sep. 12, 2019, all pages.

European Search Report for EP 19860170 completed Apr. 27, 2022, all pages.

International-type search for provisional patent application for 2018903492 dated Sep. 17, 2018, all pages.

* cited by examiner

REMOTELY VERIFYING AN IDENTITY OF A PERSON

CROSS-REFERENCE TO RELATED APPLICATIONS

The present application claims priority from AU 2018903424 and AU 2018903492 the contents of which are incorporated herein by reference in their entirety.

TECHNICAL FIELD

The following relates to systems and methods for remotely verifying an identity of a person.

BACKGROUND

As a result of fraud, money laundering and terrorist funding activity, many businesses are obligated to conform with regulatory requirements where it may be necessary to verify the identity and/or the age of a person. In some cases, it is also desirable for unregulated businesses who are exposed to high levels of fraud to seek improved confidence in the identity of a person with whom they are remotely transacting.

The advent of the internet, and the rise of remote eCommerce and service delivery, has meant that verifying the identity of a person to the standard required by traditional regulation, or sufficient to combat fraud, can present challenges. In the past, for example, it was usual for a person to prove their identity to a bank officer, lawyer, notary, postal employee or other qualified person by presenting their personal proof of identity (PoI) and Proof of Address (PoA) to the qualified person for visual inspection and examination. The qualified person would then create an identity verification document confirming the identity of the person, which may have been for internal bank use, or have been conducted as a service by the qualified person for the benefit of the third party seeking to verify the identity of the person. The identity verification document, along with the PoI and PoA, would then usually be posted to the third party, and processed as part of the third party's back office operation, prior to the third party providing a service the person.

One problem with this type of identity verification is that it is extremely slow for the person to have their identity verified, because verification is always associated with a physical journey to visit a qualified person's office or a post office. This may lead to a high rate of abandonment, and/or a reluctance by people to use services that require the identity verification.

SUMMARY

Systems and methods described herein may allow automatic verification of identifying documents remotely, for example, in an efficient, easy and secure manner. In particular, a person may be identified without having to make physical journeys to visit offices of persons qualified to certify copies of identifying documents. Instead, the person being a user of a device may have their identity verified remotely. Many desktop, laptop and mobile devices now have variable resolution photographic image capture capabilities, in addition to variable resolution streaming video capabilities, and also support secure file transfer mechanisms, which may be used in the methods and systems discussed herein.

A computer-implemented method for remotely verifying an identity of a user is provided, the method comprising:
receiving, at a first data processing device via a video data connection, a live video stream of the user from a second data processing device;
configuring a video bandwidth for the video data connection, wherein a data bandwidth available for a data connection is separate from the video bandwidth;
receiving, at the first data processing device via the data connection from the second data processing device, or another data processing device, using the data bandwidth, identifying data captured from an identifying means;
determining, by the first data processing device, first biometric data based on the identifying data;
comparing, by the first data processing device, second biometric data based on the live video stream to the first biometric data; and
verifying an identity of the user, by the first data processing device, based on a correspondence between the first biometric data and the second biometric data.

There is provided A computer-implemented method for remotely verifying an identity of a user, the method comprising:
receiving, at a first data processing device via a video data connection, a live video stream of the user from a second data processing device, the video data connection having a video bandwidth;
establishing a separate data connection between the first data processing device and the second data processing device, wherein the data connection has a data bandwidth;
receiving, at the first data processing device from the second data processing device, or another data processing device, using the data bandwidth, identifying data captured from an identifying means;
determining, by the first data processing device, first biometric data based on the identifying data;
comparing, by the first data processing device, second biometric data based on the live video stream to the first biometric data; and
verifying an identity of the user, by the first data processing device, based on a correspondence between the first biometric data and the second biometric data.

The computer-implemented method may, for example, allow users to be reliably verified remotely using biometrics from a real-time video stream of the user and biometrics from an identifying means. The computer-implemented method may ensure that a video chat is kept "open" between an interviewer and interviewee (user) in accordance with the regulatory requirements for customer due diligence interviews in many countries. This may be achieved by keeping a data bandwidth separate from the video data bandwidth for sending data. This may avoid interruption of the video chat when transmitting identifying document data and other identifying data, requested by the interviewer, during a customer due diligence interview.

The live video stream of the user received at the first data processing device may persist throughout the receiving of the identifying data.

The live video stream of the user received at the first data processing device may be displayed on a display, for example, for a verifier to review.

Establishing a separate data connection 110 may comprise partitioning the video bandwidth to leave a data bandwidth free by transmitting control data from the first data processing device to the second data processing device to reconfigure one or more parameters of the live video stream.

Configuring a video bandwidth for the video data connection 108, wherein a data bandwidth available for a data connection 110 is separate from the video bandwidth, may comprise: adapting a video bandwidth of the live video stream to leave a data bandwidth free by transmitting control data from the first data processing device to the second data processing device to reconfigure one or more parameters of the live video stream.

The identifying data may be captured by the second data processing device from the identifying means and may be received by the first processing device from the second data processing device using the data bandwidth.

The video bandwidth may be adapted or partitioned based on one or more of the following: a detected bandwidth between the second data processing device and the first data processing device, a bandwidth needed for the data connection 110, and a detected level of fluctuation in the bandwidth between the second data processing device and the first data processing device.

The control data may control a focal length of a video capture device, associated with the second data processing device, that captures the real-time video stream.

The one or more parameters of the live video stream may comprise one or more of the following: a field of view of the live video stream; a resolution of the live video stream and a frame rate of the live video stream.

The one or more parameters of the live video stream may be reconfigured to reduce a bit rate of the live video stream.

The one or more parameters of the live video stream may be reconfigured to enhance the second biometric data of the user in the live video stream.

The identifying data may be captured from an identifying means of the user, such as an identification document or an identification card.

The identifying data captured from the identifying means may comprise an image of the user.

The first biometric data and the second biometric data may represent one or more of the following: facial characteristics; fingerprint characteristics; speech characteristics; iris characteristics; retina characteristics; palm print characteristics; heart beat characteristics; gait characteristics and movement characteristics.

The identity of the user may be verified when the correspondence between the first biometric data and the second biometric data is greater than a threshold correspondence.

The identifying data may comprise user detail data including one or more of the following: a name; a date of birth; a place of birth; a citizenship; a street address; an email address; an identification document number; a telephone number; a bank account number; a card number; a merchant identifier; a device fingerprint; and a government issued identifier.

The method may further comprise assigning an operation identification number to the identifying data.

The method may further comprise storing identifying data based on the identifying data in a database with the assigned operation identification number.

The method may further comprise:
  comparing the identifying data to previously stored identifying data in a database;
  determining a match between the identifying data and one or more items of previously stored identifying data; and
  associating the identifying data with an operation identification number assigned to the one or more items of previously stored identifying data.

The method may further comprise storing the first biometric data and the second biometric data in the database with the assigned operation identification number.

The method may further comprise associating a customer identification of the user with the operation identification number.

The identifying data may be captured using one or more of the following data capture devices:
  an image capture device associated with second processing device; and
  a near field communication device associated with second processing device.

The method may further comprise detecting an identifying means in an image stream captured using the image capture device by comparing the image stream against an identifying means template.

Detecting an identifying means in the image stream captured using the image capture device may comprise identifying one or more of the following features in the image stream: security features, photographs, issuer data and biodata.

Comparing the image stream against an identifying means template may comprise comparing a location of the one or more features in the image stream against a location defined in the identifying means template.

Comparing the image stream against an identifying means template may comprise comparing the one or more features in the image stream against one or more features defined in the identifying means template.

Capturing identifying data may comprise capturing an image of the identifying means when the identifying means is detected in the image stream captured using the image capture device.

The method may further comprise selecting the identifying means template based on a user input received at the second data processing device.

The method may further comprise automatically selecting the identifying means template based on a fit to an image of the identifying means in the image stream.

The method may comprise displaying guide lines, based on the identifying means template, in a user interface of the second data processing device to assist the user with positioning the identifying means relative to the image capture device.

The method may further comprise extracting, by the first data processing device, the first biometric data from the image stream based on fields defined by the identifying means template.

The method may further comprise extracting user detail data from the image stream by optical character recognition based on the fields defined by the identifying means template.

Capturing the identifying data may comprise capturing data from an embedded chip of the identifying means by a near field communication (NFC) device associated with the second data processing device.

The method may further comprise identifying one or more capture devices associated with the second computing device and requesting the capture of the identifying data by the one or more capture devices.

A system for remotely verifying an identity of a user is provided, the system comprising: a communication means for data communication with a data processing device; and a processor configured to:
  receive, by the communication means, a live video stream of the user via a video data connection from the data processing device;

configure a video bandwidth for the video data connection, wherein a data bandwidth available for a data connection is separate from the video bandwidth;

receive, by the communication means from the data processing device, or another data processing device, using the data bandwidth, identifying data captured from an identifying means;

determine first biometric data based on the identifying data; compare second biometric data based on the live video stream to the first biometric data; and verify an identity of the user based on a correspondence between the first biometric data and the second biometric data.

A computer readable medium is provided. The computer readable medium storing software that when executed by a processor performs the following:

receiving, at the processor, a live video stream of a user via a video data connection from a data processing device;

configuring a video bandwidth for the video data connection, wherein a data bandwidth available for a data connection is separate from the video bandwidth;

receiving, at the processor from the data processing device, or another data processing device, using the data bandwidth, identifying data captured from an identifying means;

determining, by the processor, first biometric data based on the identifying data;

comparing, by the processor, second biometric data based on the live video stream to the first biometric data; and verifying an identity of the user, by the processor, based on a correspondence between the first biometric data and the second biometric data.

Further forms and/or features of the present disclosure will become apparent from the following detailed description.

There is provided a data processing device for remotely verifying an identity of a user, the device comprising:

a processor configured to:
receive a live video stream of the user from a second data processing device via a video data connection, the video data connection having a video bandwidth;

receive identifying data from a second data processing device via a data connection having a data bandwidth, wherein the identifying data was captured from an identifying means;

determine first biometric data based on the identifying data;

compare second biometric data based on the live video stream to the first biometric data; and verify an identity of the user based on a correspondence between the first biometric data and the second biometric data.

There is provided a system for remotely verifying an identity of a user, the device comprising:

a second data processing device having a processor configured to:
transmit a live video stream of the user via a video data connection, the video data connection having a video bandwidth;

transmit identifying data captured from an identifying means via a data connection having a data bandwidth, wherein the identifying data is captured from an identifying means;

a first data processing device having a processor configured to:
receive the live video stream of the user from the second data processing device;

receive the identifying data from the second data processing device;

determine first biometric data based on the identifying data;

compare second biometric data based on the live video stream to the first biometric data; and verify an identity of the user based on a correspondence between the first biometric data and the second biometric data.

There is provided a computer readable medium storing software that when executed by a processor causes the processor to:

receive a live video stream of a user from a second data processing device via a video data connection, the video data connection having a video bandwidth;

receive identifying data from a second data processing device via a data connection having a data bandwidth, wherein the identifying data was captured from an identifying means;

determine first biometric data based on the identifying data;

compare second biometric data based on the live video stream to the first biometric data; and verify an identity of the user based on a correspondence between the first biometric data and the second biometric data.

BRIEF DESCRIPTION OF DRAWINGS

Some of the embodiments will be described in detail, with reference to the following figures, wherein like designations denote like features.

DESCRIPTION OF EMBODIMENTS

Figure 1:
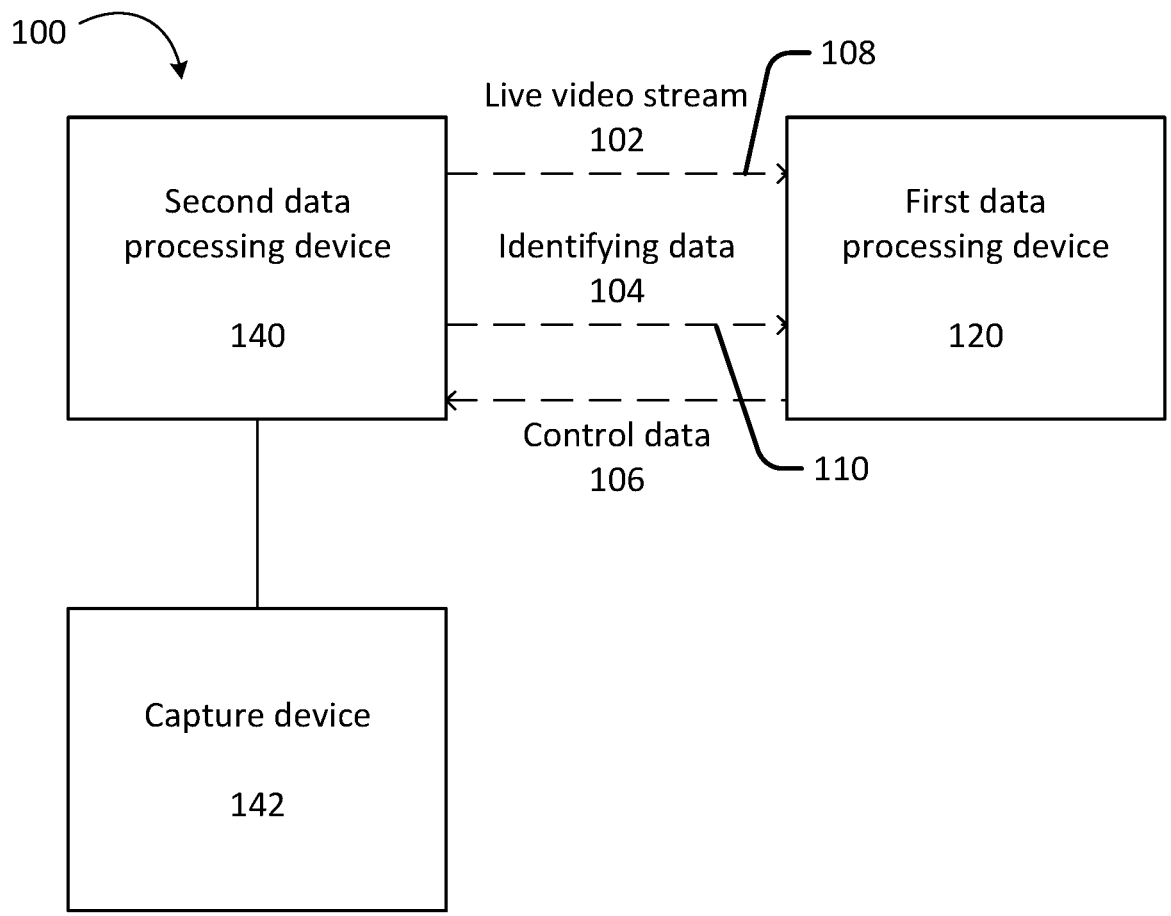
FIG. 1 illustrates a system for remotely verifying an identity of a user.

FIG. 1 illustrates a system for remotely verifying an identity of a user. The system comprises a first data processing device 120 of a verifier and a second data processing device 140 of a user. A capture device 142 may be associated with the second data processing device 140 to capture a video stream 102 of the user which may be transmitted to the first data processing device 120 via a video data connection 108 having a video bandwidth, for example, as part of a video interview between the verifier and the user. For example, the verifier may be remotely verifying an identity of the user prior to the user being provided a product or service.

The second data processing device 140 may also transmit identifying data 104 captured from an identifying means to the first data processing device 140 over a separate data connection 110. The first data processing device 140 may then compare aspects of the identifying means in the identifying data 104 to aspects of the user captured in the video stream to verify the identity of the user. The identifying data 104 may be captured using the same capture device 142 that is used to capture the video stream 102 or a different capture device associated with the second data processing device 140.

The first data processing device 120 may transmit control data 106 to the second data processing device 140 to reconfigure one or more parameters of the video stream 102. This may allow a video bandwidth of the video stream 102 to be adapted, or partitioned, to leave a data bandwidth free for transmitting other data, such as the identifying data 104, from the second data processing device 140 to the first data processing device 120 without interrupting the video stream 102. This effectively partitions the video bandwidth to create the data bandwidth. The video interview may therefore persist or continue uninterrupted throughout the sending of the other data.

The video stream 102 and the identifying data 104 may be transmitted on separate connections or data streams. For example, the live video stream may be transferred between the second data processing device 140 and the first data processing device 120 on a video connection and the identifying data 104 may be transferred between the second data processing device and the first data processing device on a data connection 110.

The video connection may be configured to leave a portion of the available bandwidth between the second data processing device and the first data processing device free for the data connection 110. That is, the video bandwidth of the video connection is partitioned to leave a data bandwidth for the data connection 110. Additional bandwidth may be left free based on a detected fluctuation in the bandwidth between the second data processing device 140 and the first data processing device 120.

The data connection 110 may be on the same link as the video connection, or it may be an independent link, such as an Multi Media Message Service (MMS) link over GSM mobile channels, or it may be that the first link is a streaming link established under https or TLS, and the second data link is a 'batch' type link such as a Secure File Transfer Protocol (SFTP) or SMTP. The SFTP may be established by the first device as a 'pull' request, or by the second device as a 'push' request.

In some embodiments, one or more parameters of the live video stream may be reconfigured by the control data 106 to set a bit rate of the live video stream. Example video bit rates are provided below in Table 1, and may be selected based on the available bandwidth. For example, the system may check available bandwidth before initiating the video stream, and select a resolution from Table 1, with at least 10% (or other configured value) additional capacity to allow for transmission of the photo images. Where the data connection 110 is on an independent link, the video connection may be configured to leave a portion of the available bandwidth between the second data processing device and the first data processing device free to avoid interruption of the video stream from fluctuations in the bandwidth.

TABLE 1

| | Video bit rates | |
|---|---|---|
| Type | Video bit rate, Standard frame rate (24, 25, 30) | Video bit rate, High frame rate (48, 50, 60) |
| 1080p | 8 Mbps | 12 Mbps |
| 720p | 5 Mbps | 7.5 Mbps |
| 480p | 2.5 Mbps | 4 Mbps |
| 360p | 1 Mbps | 1.5 Mbps |

The aspects of the identifying means may be evaluated against identifying means templates, and aspects of the identifying means may be compared to biometric aspects of the user, where said aspects are independently sourced from firstly either the image(s) of the identifying means, or biometric data stored on a NFC or radio frequency readable chip within the identifying means, and secondly extracted from the video stream of the user. The biometrics compared may include, for example, facial features and/or fingerprints, or other biometrics discussed hereinafter.

Figure 2:
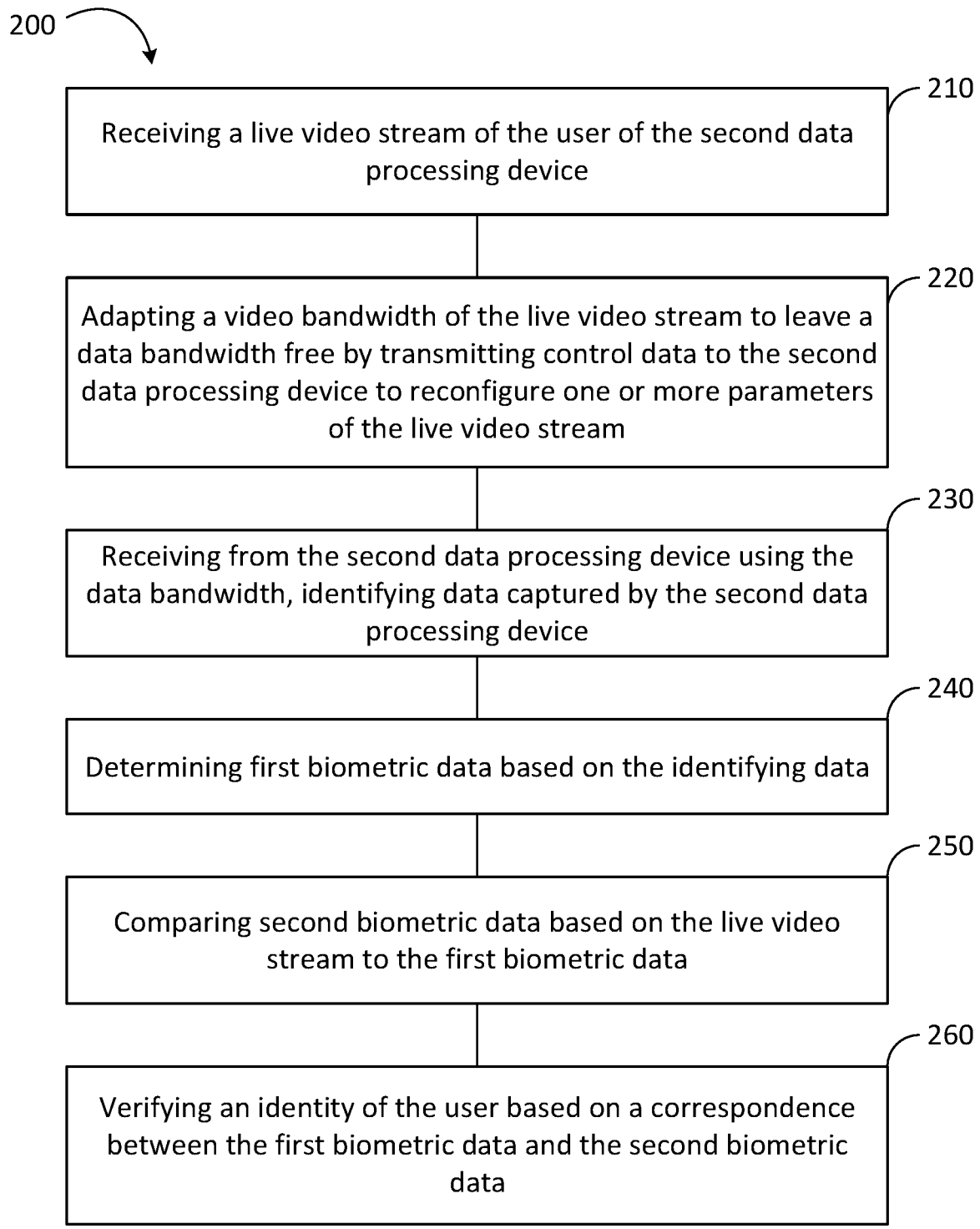
FIG. 2 illustrates a computer-implemented method for remotely verifying an identity of a user.

FIG. 2 illustrates a computer-implemented method 200 for remotely verifying an identity of a user. For example, the method 200 may be implemented by the first data processing device 120 in the system 100 to verify an identity of the user.

At step 210, the method 200 comprises receiving a live video stream of the user from the second data processing device. For example, the live video stream may be captured by the capture device and then received at the first data processing device 120 from the second data processing device 140.

At step 220, the method 200 comprises adapting, or partitioning, a video bandwidth of the live video stream to leave a data bandwidth free by transmitting control data to the second data processing device to reconfigure one or more parameters of the live video stream. The one or more parameters of the live video stream may be reconfigured to reduce a bit rate of the live video stream and/or to enhance the second biometric data of the user in the live video stream. In one example, the first data processing device 120 transmits the control data to reconfigure parameters including a field of view of the live video stream, a resolution of the live video stream and/or a frame rate of the live video stream. In one example, the control data controls a focal length or zoom of the video capture device 142 that captures the real-time video stream.

At step 230, the method 200 comprises receiving from the second data processing device using the data bandwidth, identifying data captured by the second data processing device. For example, the identifying data may be captured by the capture device 142 or another capture device associated with the second data processing device 140. The identifying data may be data captured from an identifying means such as an identification document or an identification card. The identifying data may comprise one or more images of the identifying means and/or data captured from an embedded chip of the identifying means, for example, by a near field communication (NFC) device associated with the second data processing device.

At step 240, the method 200 comprises determining first biometric data based on the identifying data. The first biometric data may be biometric information relating to the user captured from the identifying means.

At step 250, the method 200 comprises comparing second biometric data based on the live video stream to the first biometric data. The second biometric data may be of a similar aspect of the user to the first biometric data and may be extracted from the live video stream of the user.

At step 260, the method 200 comprises verifying an identity of the user based on a correspondence between the first biometric data and the second biometric data. The identity of the user may be verified, for example, when the correspondence, such as similarity, between the first biometric data and the second biometric data is greater than a threshold correspondence. In one example, the first biometric data comprises facial details of the user from an image of the user on the identifying means and the second biometric data comprises facial features of the user extracted from the live video stream. In one example, the first biometric data comprises fingerprint characteristics of the user from an embedded chip of the identifying means and the second biometric data comprises fingerprint characteristics of the user extracted from the live video stream and/or from a fingerprint reader associated with the second data processing device.

However, the biometric data of the user may be any suitable type of biometric data and may include, for example, the user's facial characteristics, fingerprint characteristics, multiple finger fingerprints, five fingerprints simultaneously from one hand, palm prints, measured heart-rate and/or heartbeat, iris scan and/or retina scan, facial photograph, speech sample, video sample, videoed gait and/or movement, and/or a photo of a manual signature compared to video of the user executing their manual signature.

Figure 3:
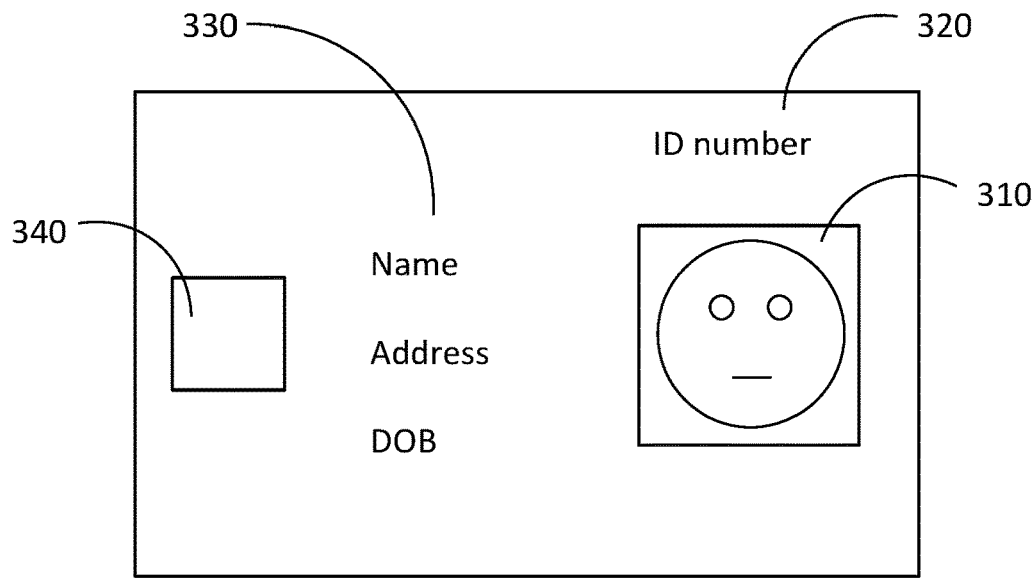
FIG. 3 illustrates an example identifying means of a user.

FIG. 3 illustrates an example identifying means 300 of a user. The identifying means 300 may be for example, a passport, identification card or another type of identification. The identifying means 300 comprises a photograph 310 of the user, an identification number 320, identifying details 330 of the user and an embedded chip 340. The identifying details 330 in the example identifying means include a name of the user, a street address of the user and a birth date of the user. However, the identifying means may include other identifying details, including, for example, a citizenship, an email address, an identification document number, a telephone number, a bank account number, a card number such as a debit card number or a credit card number, and a government issued identifier such as tax file number or a social security number.

The embedded chip 340 may store further identifying data of the user including biometric data such as fingerprint characteristics, speech characteristics, iris characteristics, retina characteristics, palm print characteristics, heart beat characteristics, gait characteristics and movement characteristics. The embedded chip 340 may be read by a near field communication (NFC) device associated with the second data processing device 140 to capture the further identifying data.

Figure 4:
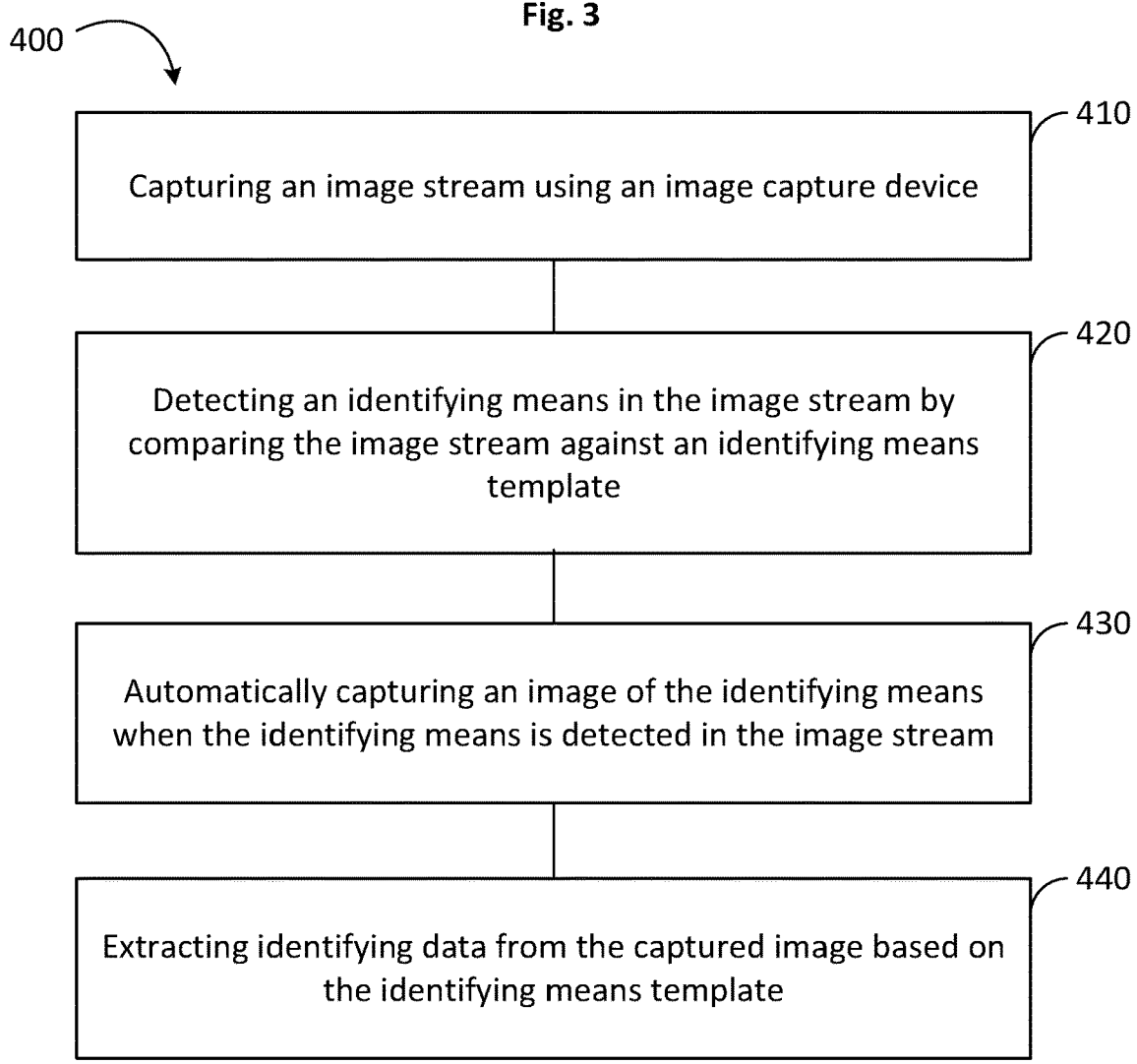
FIG. 4 illustrates a method for capturing identifying data from an identifying means.

FIG. 4 illustrates a method 400 for capturing and extracting identifying data from an identifying means. The method 400 may be used to capture the identifying data in the method 200, for example, by software delivered to the second data processing device 140 by the first data processing device 120.

At 410, the method 400 comprises capturing an image stream using an image capture device associated with the second data processing device 140. The image capture device may be the same device used to capture the video stream 102 or another capture device associated with the second data processing device 140.

At 420, the method 400 comprises detecting an identifying means in the image stream by comparing the image stream against an identifying means template. Detecting an identifying means in the image stream may comprise, for example, identifying one or more of the following features in the image stream: security features, photographs, issuer data and biodata. Comparing the image stream against an identifying means template may comprise comparing a location of the one or more features in the image stream against a location defined in the identifying means template, and/or comparing the one or more features in the image stream against one or more features defined in the identifying means template.

In one example, multiple templates may be stored for detecting different types of identifying means. For example, the method 400 may comprise selecting the identifying means template based on a user input received at the second data processing device where a user selects one or more templates from available templates, and/or automatically selecting the identifying means template based on a fit to an image of the identifying means in the image stream.

At 430, the method 400 comprises automatically capturing an image of the identifying means when the identifying means is detected in the image stream.

At 440, the method 400 comprises extracting identifying data from the captured image based on the identifying means template. In one example, the method comprises extracting the first biometric data from the identifying data based on fields defined by the identifying means template. In one example, the method further comprises extracting user detail data from the identifying data by optical character recognition based on the fields defined by the identifying means template.

In one example, the identifying means includes data related to the user, such as biometric data or other user detail data, stored on an embedded chip of the identifying means. This data may be read and transmitted to the second data processing device for analysis and comparison with the live video stream of the user, as well as provide identity information related to the user to compare to stored records, such as name, date of birth, place of birth, nationality etc. The biometric features and associated identity data read directly from an embedded chip located within or as part of the identifying means may be transmitted as a separate data packet or stream to the live video stream and/or the identifying data captured by the image capture device.

The reading of the embedded chip's data may be in conjunction with a photographic image being taken of the identifying means, which may also present the same data, different or additional data to that stored on the embedded chip. The data is then evaluated for consistency, and discrepancies highlighted for review as part of a report or dashboard presented to an operator of the dashboard, such as the verifier.

In some embodiments, other biometric sensors such as heartbeat and/or heart rate monitors, iris and/or retina scanners, and other biometric sensor means may be used to collect data by the second data processing device to verify the user. This data may be received by the first data processing device and stored for future evaluation of users.

In some embodiments, the user may be requested to perform certain body movements during a video interview with a verifier, and those movements may be analyzed in the live video stream, for example by the first data processing device, and compared with video of movements previously stored. A comparative score may be presented to the operator or verifier after evaluation of the biometric features. For example, the comparative score may represent a correspondence between the first biometric data and the second biometric data. The user may then be verified based on the comparative score.

Figure 5:
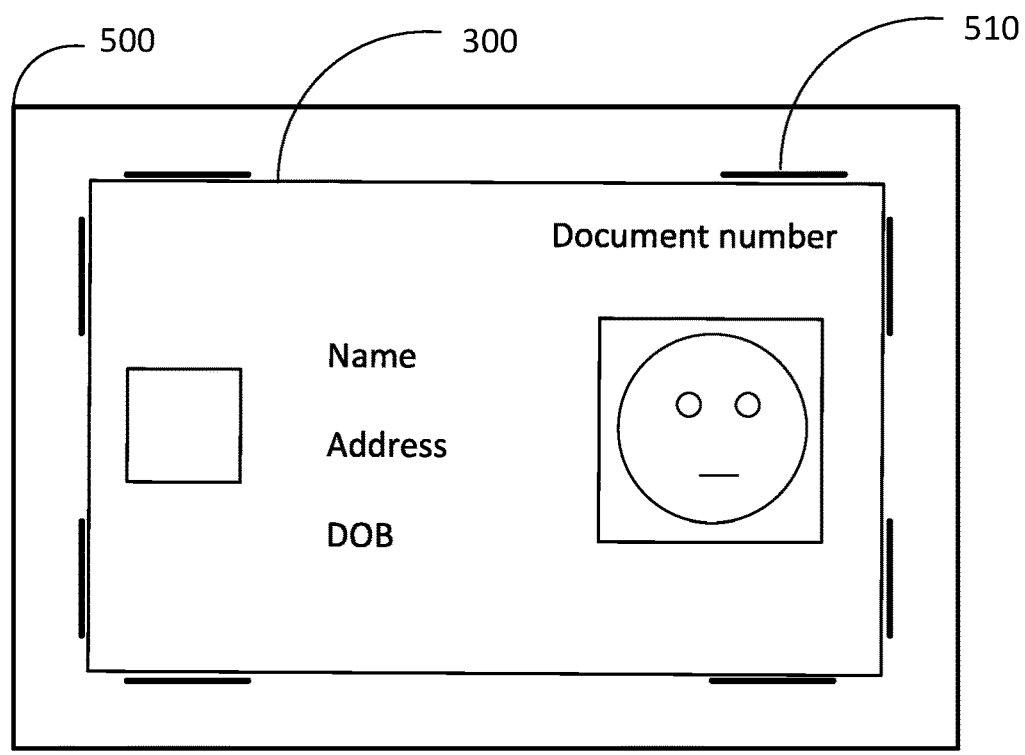
FIG. 5 illustrates a live image in a user interface of the second data processing device.

FIG. 5 illustrates a live image 500 in a user interface of the second data processing device 140. The live image 500 shows a live image stream captured by a capture device associated with the second data processing device 140. The live image includes the identifying means 300.

Guidelines 510 are shown over the live image 500 to assist the user with positioning the identifying means 300 relative to the to capture device to capture an image of the identifying means. The guidelines 510 may be based on an identifying means template. For example, an aspect ratio or other feature of the guidelines may be automatically adapted based on the identifying means template.

Figure 6:
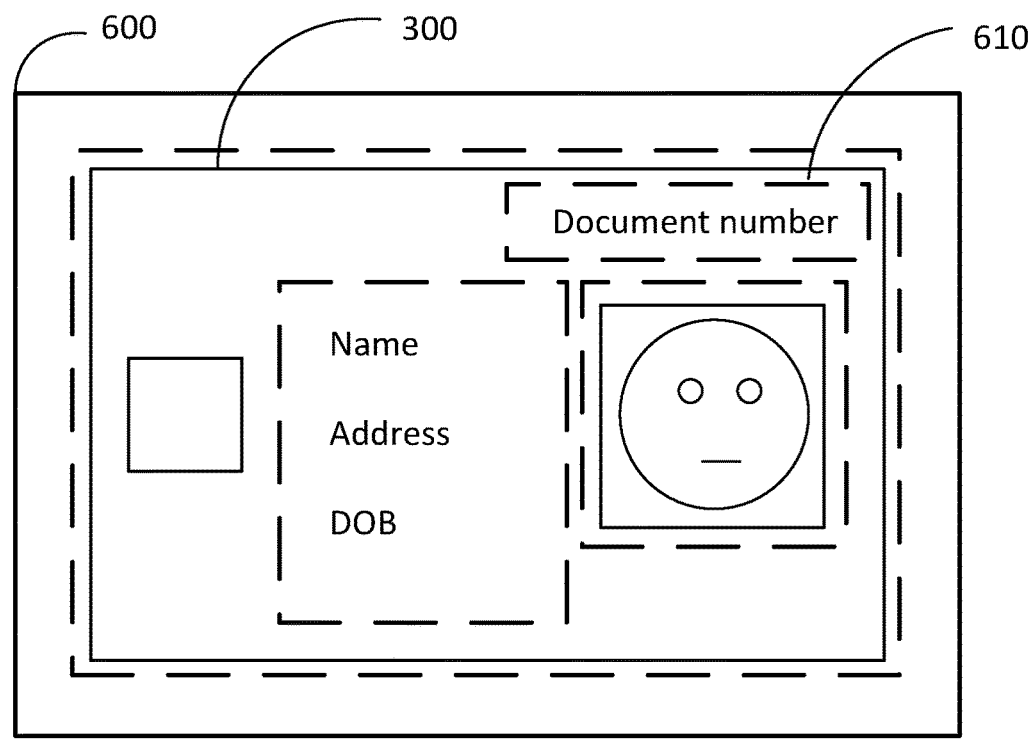
FIG. 6 illustrates data fields in the captured image that have been detected based on fields defined in the identifying means template.

FIG. 6 illustrates example data fields 610 in a captured image 600 that have been detected based on fields defined in the identifying means template. The identifying data including the first biometric data and/or user detail data may be extracted from the identifying means based on the data fields. In one example, at least some of the identifying data is extracted from text data fields by optical character recognition. In one example, the biometric data is extracted from image data fields using, for example, facial recognition algorithms, fingerprint analysis algorithms, or other biometric analysis algorithms. The identifying data may comprise user detail data including one or more of the following: a name; a date of birth; a place of birth; a citizenship; a street address; an email address; an identification document number; a telephone number; a bank account number; a card number; a merchant identifier; a device fingerprint; and a government issued identifier.

Figure 7:
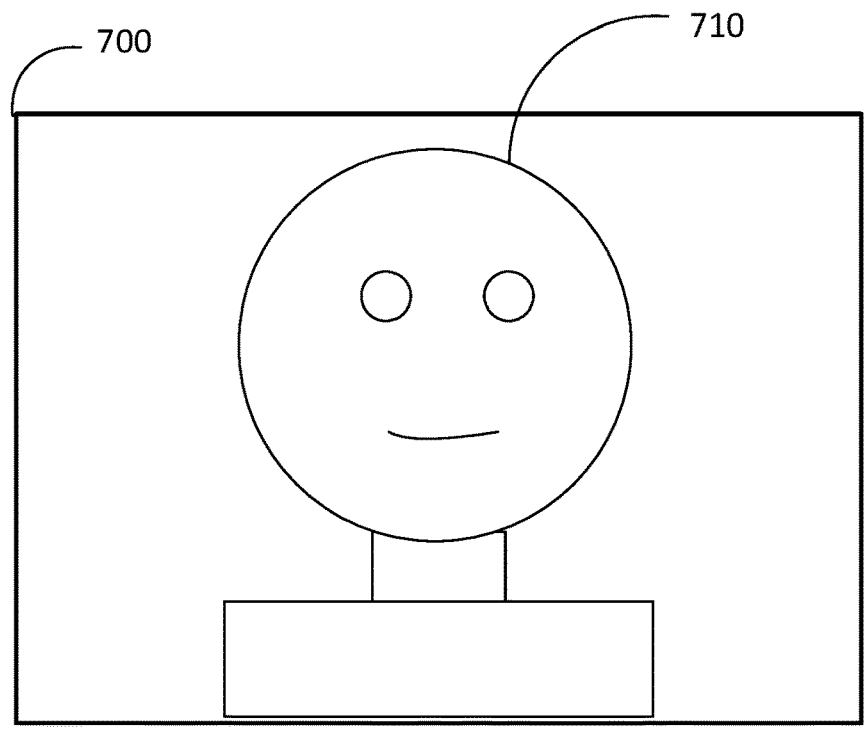
FIG. 7 illustrates a video stream captured by the first data processing device.

FIG. 7 illustrates a video stream 700 captured by the first data processing device 120. The video stream 700 shows the user 710. The second biometric data of the user may be extracted from the video stream, for example, by facial recognition algorithms or other biometric analysis algorithms. The second biometric data may represent features of the user such as: facial characteristics, iris characteristics, retina characteristics, gait characteristics or movement characteristics. In one example, the video may be received from a palm or fingerprint reader associated with the second data processing device 140, and the biometric data may represent features of the user such as: fingerprint characteristics or palm print characteristics. In some embodiments, the video stream 700 may be adjusted remotely via the first data processing device 120, for example, to improve quality of the video stream and/or focus on specific features of the user.

In some embodiments, the biometric features on the identifying means may be identified, captured and transmitted via one or more high resolution image captures, independent of the main identifying means image capture and the video stream. The image capture may include a remote zoom function initiated by the operator or verifier, the user or automatically by the first or second data processing device, or a combination of all three. In one example, the remote zoom is initiated by a control signal from the first data processing device 120. For example, the first data processing device 120 may identify a photograph of the user in an image of the identifying means and initiate a remote zooming to capture the photograph in higher resolution.

In one example, the video stream 700 includes an audio stream and the second biometric data may represent features of the user such as speech characteristics based on the audio stream or heart beat characteristics measured by a specialised device. The second data processing device may have an audio capture device associated with it, for example a microphone, which may be integrated in or connected to the second data processing device 140. The audio capture device may stream the audio directly to the first data processing device 120, or the audio may be recorded by the second data processing device 140 and then sent, for example as a file, to the first data processing device 120. The video data connection 108, with which the video signal and optionally also the audio signal is transmitted, may be provided in encrypted form. The first data processing device 120 may comprise a display device, such as a screen, and/or a sound reproduction device, such as a loud-speaker, for example, to provide information based on the captured data to the verifier.

The first data processing device 120 and/or the second data processing device 140 may use algorithms to identify biometric characteristics such as facial, speech, iris, retina, gait, heartbeat, heart rate or fingerprint features, and may identify and match those biometric features against stored data, photographic images and/or video sources. These biometric features may then be compared between the image and the video sources to determine a correspondence, for example, by calculating a comparative match score. The match score may be presented to the verifier.

Figure 8:
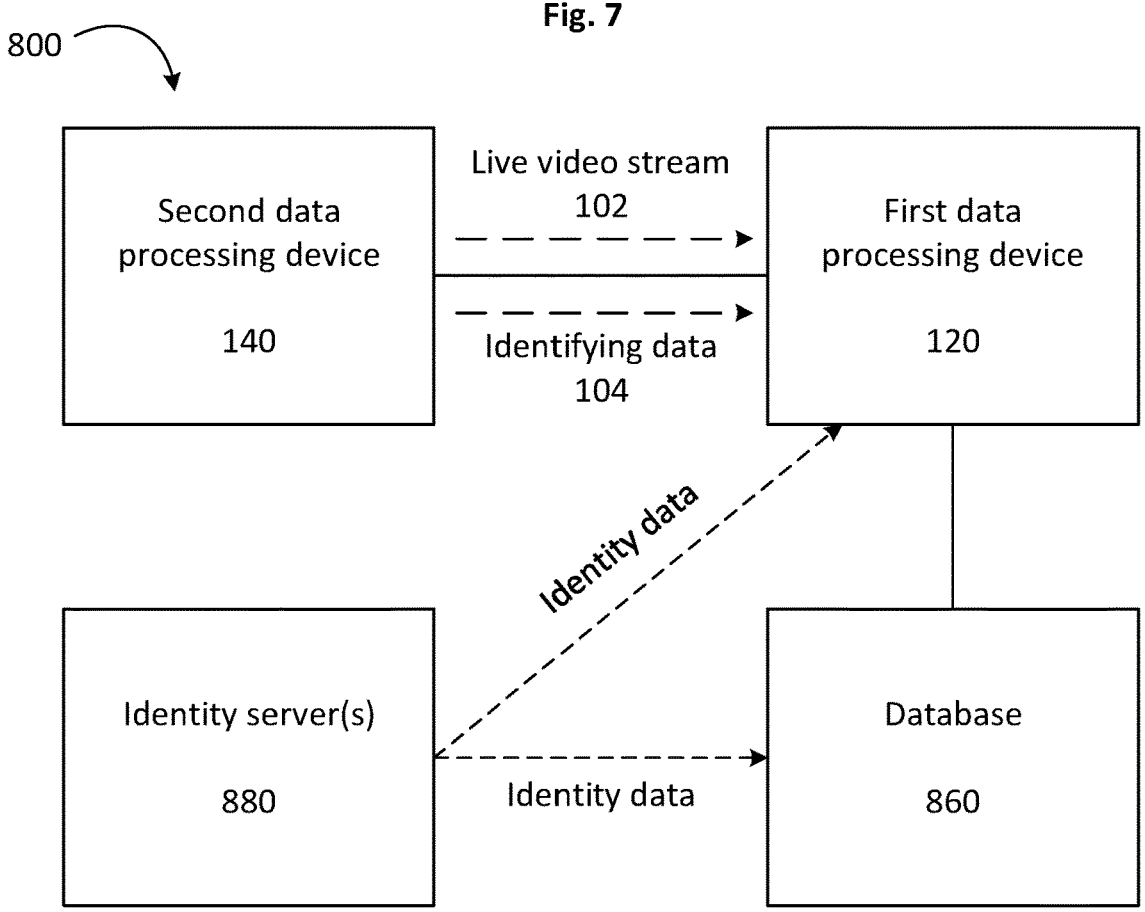
FIG. 8 illustrates another example system for remotely verifying an identity of a user.

FIG. 8 illustrates a system 800 for remotely verifying an identity of a user. The system comprises the first data processing device 120 of the verifier and the second data processing device 140 of the user. The system 800 comprises a database 860 for storing user data, such as data captured from the video stream of the user and the identifying means. The database 860 may also store other data including data retrieved by the database 860 or the first data processing device 120 from identity servers, such as identity checking services and government databases. In one example, the database 860 is associated with the first data processing device 120. In another example, the database 860 is remote from the first data processing device 120 and may be shared between multiple devices used by verifiers.

The methods described above may be integrated in another method that a requests an identification or verification of a user. For example, a user on a website of a vendor may wish to enter into a contract. In order to complete the contractual agreement, it may be necessary to check that the user exists, for example, to satisfy legal regulations. Such a check may include a check of the user's identity and/or age. The vendor may be, for example, a bank with which an account is to be opened, a retailer selling goods that fall under some form of regulation that excludes minor persons, or another service provider (e.g., online gaming, betting shop), which requires proof that the user has reached the age of majority before the contract can be concluded. The vendor's website may be made available by means of a third data processing device.

The user may access the website and interact with it via the second data processing device, for example. For this, the user may use a web browser (called a browser for short), for example, which is installed on the second data processing device. In one example, the user enters user data in a form on the vendor's website. Alternatively, user data may already be stored with the vendor. In this case, the user can log onto the third data processing device using a form of user identification (e.g., username and password or via a transaction number (TAN) and Customer Identification Number or a one-time passcode sent to a device or a combination of these) so that the existing user data is used. If the user's identity and/or age has to be checked before the contract can be concluded by signing the contract, the system may perform one or more of the methods described herein to check the user. For example, the vendor's web site may include a button that initiates one or more methods described herein, for example, by sending a request to the first data processing device.

After the button is activated, the user data may be transmitted from the third data processing device to a fourth data processing device, which may be operated by the provider of the system. The fourth data processing device may be coupled to the database 860, for example in the manner of a customer relationship management (CRM) system or an online dashboard style interface for use by a human operator, such as the verifier, to evaluate, review or refer to results of the method(s). The user data may be transmitted in encrypted form. The user data is then compared with data stored in the database records. The fourth data processing device may then generate reports for the vendor who may have used the system to identify persons on their behalf. The vendor may be given access to the database or CRM via electronic means, or the vendor's human operators may be granted access to some or all of the features of the dashboard.

The user data may for example include the following information about the user either individually or in any combination thereof: name (first name and/or last name), address (street, house number, postal code and city), a telephone number (landline and/or mobile number), place of birth, country of birth, country of citizenship, social media account details, instant message details and an email address. When the user data is entered, it may be compulsory for the user to supply certain data, for example first name, last name, mobile number and/or email address.

The system may compare the transmitted user data with data records from the database based on all the user data or on selected portion of the user data. For example, the system may determine whether the email address exists in the database. If so, the system may use the email address to identify the user in the database. When the transmitted user data is compared with the data records from the database, the system may determine a similarity relation. For example, the system may identify the user as a user already in the database if the transmitted address differs from the stored address (e.g., due to a move), but the other data matches.

The system may display a graphical user interface to adjust a threshold value for the similarity of the data records, for example, in the dashboard. Unique data attributable to a person may include name, surname, date of birth, place of birth, citizenship, street address, identification document or card number, email addresses, phone numbers, social media pages, instant message addresses, bank account numbers, credit and/or debit card numbers, device fingerprint, merchant allocated identifier, social security number and/or other government issued identifier. The user may also be requested by the system to provide a sample of their signature, where the act of signing takes place in the view of the video stream under supervision by the verifier or operator, and the signature is then photographed by the image capture device for comparison against a signature on the identifying means.

The system may compare a unique document identification number captured from an identifying means with stored data in the database to determine if the unique document identification number has been used previously, or if the personal attributes in any combination including name, surname, date of birth and/or country of issue have been previously submitted. The system may further compare the biometric data, including for example, facial, fingerprint and/or signature images, with those previously stored on the database to determine if these features match those of a previously stored user.

Where the system determines that data or combinations of data that are unique to a person/user already existing in the database, it may mean that the subsequent attempt is either an update from the person and is an existing user, or, it may mean that it is an impersonation attempt by a third party attempting to use some or part of existing user's identity information. The system may notify the verifier by the dashboard accordingly.

If the user is identified as having been captured in the database already on the basis of the transmitted data, the user is regarded as an existing user. If the user data does not match data in the database, the user is considered to be a new user. In the context of the user classified as a new user, the system may create a user profile for the user based on an verification of the user, so that the user is later recognized as an existing user in subsequent interactions. In one example, in order to capture the user as a new user, the system may need to verify their identity, to satisfy legal requirements, for example. In this example, the identifying means may be a personal identification document, for example an identity card, a passport or a residency permit.

In one example, the identifying means may be one that is identifiable as belonging to a person, such as for example a health insurance card, a pension card, a library card, a firearms license, marine license, driving license or a disability card.

The system may store the result of the verification together with the user data in the database. An operation identification number and/or a customer identification number may also be stored with the result of the verification and the user data, as discussed below. For example, the data may be transmitted from the first data processing device to the fourth data processing device and stored in a database coupled therewith. At least part, if not all of the video stream, the captured image(s) and/or the audio signal may be stored in the database.

An operation identification number may be assigned to user data, such as the identifying data received by the first data processing device. The user data may include, for example, an identification means type a user's biometric features extracted from the video stream, one or more images of the identifying means captured by an image capture device associated with the second computing device, other data extracted from the identification means such as via NFC, and data retrieved from other locations such as identity servers.

Figure 9:
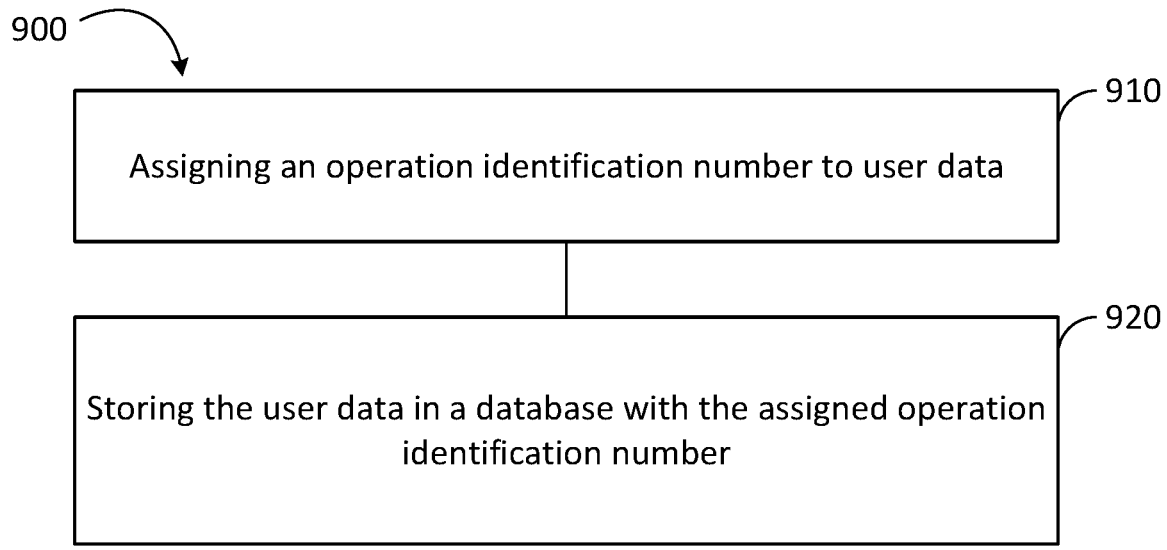
FIG. 9 illustrates a method of storing user data.

FIG. 9 illustrates a method 900 of storing user data. In one example, the method 900 is used with the system 800, and may, for example, be performed by the first data processing device 120 or another server (not shown).

At 910, the method 900 comprises assigning an operation identification number to the user data. The user data may include, for example, the identifying data, data from the video stream, the first biometric data, the second biometric data and/or other data relating to the user that has been captured or retrieved by the system.

At 920, the method 900 comprises storing the user data in a database with the assigned operation identification number.

In some embodiments, the method 900 may comprise associating a customer identification of the user with the operation identification number. For example, an operation identification number may be assigned for each identifying means of the user and the operation identification numbers may be associated with the customer identification number of the user. In one example, the customer identification number is determined by comparing the user data with previously stored user data.

The result of the verification may be stored in the database together with the operation identification number and the user data. In one embodiment, the method may further comprise the following steps, which are carried out optionally before the video data connection 108 is established and/or before the operation identification number is captured: generating the operation identification number in the fourth data processing device and transmitting the operation identification number from the fourth data processing device to the second data processing device. For example, the operation identification number may be received by the second data processing device from a merchant from which the user is purchasing goods and/or services, or from an identity server.

In one embodiment, the method may further comprise the following steps, which are carried out optionally after the operation identification number is detected: transmitting the operation identification number from the first data processing device to the fourth data processing device, and transmitting the user data from the fourth data processing device to the first data processing device in response to receiving the operation identification number.

Figure 10:
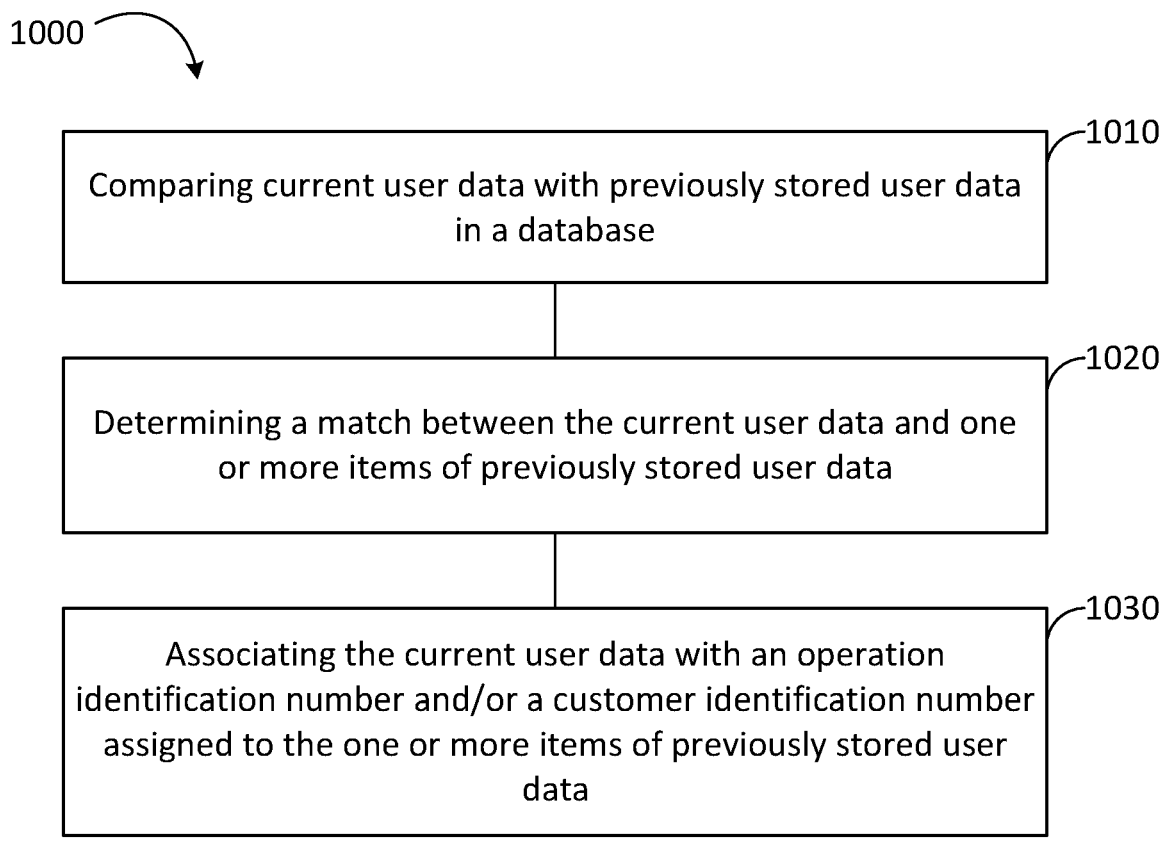
FIG. 10 illustrates a method of assigning user data.

FIG. 10 method 1000 of assigning user data. In one example, the method 900 is used with the system 800, and may, for example, be performed by the first data processing device 120.

At 1010, the method 1000 comprises comparing current user data with previously stored user data in a database.

At 1020, the method 1000 comprises determining a match between the current user data and one or more items of previously stored user data.

At 1030, the method 1000 comprises associating the current user data with an operation identification number and/or a customer identification number assigned to the one or more items of previously stored user data.

In one example, in the first data processing device, an operation identification number assigned to the user data is captured. The operation identification number may be generated beforehand by the fourth data processing device, after the customer data is received from the third data processing device, for example. The operation identification number serves as the unique identifier of the identification operation for the user. A specific, unique operation identification number can be created for each identification operation for the user. A user or customer may then be assigned a unique customer identification number, for future reference, which may then be linked to operation identification numbers. For example, if a user wishes to open an account at two banks, he must undergo identification by both banks. The system may create unique operation identification number is for each identification and assign the operation identification number to the user data, but the user will have a common reference of the unique customer identification number.

The operation identification number may be transmitted from the fourth data processing device to the second data processing device, for example via an onscreen alert on the browser, alert within a running application, an iOS or Android notification, e-mail or short message service (SMS). The operation identification number may be displayed in the browser of the second data processing device. In one example, the user transmits the operation identification number to an agent that services the first data processing device, such as the verifier, via the video data connection 108, for example. In one example, the user tells the agent the operation identification number verbally, in other words the transmission is made acoustically. The agent then enters the operation identification number in the first data processing device via an input device. In one example, the operation identification number is transmitted from the second data processing device to the first data processing device, e.g., by SFTP, POST, e-mail, MMS, SMS or an electronic web form in which the user enters the operation identification number that is to be transmitted. In one example, the operation identification number is transmitted directly from the fourth data processing device to the first data processing device.

The operation identification number may be a multi-digit number, for example. In one example, the operation identification number comprises a mix of alphanumeric characters. For example, the operation identification number may include a randomly generated number, characters, sequence of numbers and/or characters. In one example, the operation identification number is formed from an earlier operation identification number. For example, the operation identification number may incorporate a random number as well as a previous operation identification number. In one example, the operation identification number is only valid for a limited time, such as an hour. After this time has elapsed, the operation identification number is invalid and can no longer be used.

After the operation identification number is captured (by typing in, for example), the operation identification number may be transmitted to the fourth data processing device from the first data processing device. In response receiving the operation identification number, the fourth data processing device may transmit the user data assigned to the operation identification number to the first data processing device. The transmission may be encrypted. In one example, the user data transmitted by the first data processing device cannot be changed. This may allow manipulation of the user data by the agent to be reliably prevented. In one example, the user data may be changeable by the first data processing device. This enables may the existing user data to be corrected or supplemented.

Dashboard

An operator dashboard may be displayed to the verifier via a display of the first data processing device or on a further data processing device connected to the first data processing device. The operator dashboard may comprise graphical user interface (GUI) components to allow an operator to configure the service, perform a real time video interview with the user being identified, and view results of the methods and analysis performed by the system. The dashboard may include stored data of existing users, and may include search functions, alerts, and task lists whereby when a new user is identified as being prospectively the same person as an existing user. The system may request that the verifier to review the user details in the dashboard to confirm whether the new user and the existing user are the same.

The dashboard may display all collected data related to the user on a single page, including video and photographic data collected from the user, data that has been read via OCR from documents, data read via NFC, in addition to metadata that has been collected and stored by the first data processing device relating to the second data processing device. The metadata may include one or more of an IP address, ISP Service Provider, device fingerprint data, device type data, browser type and configuration details, browser location details, operating system details, language settings, cellular network provider, cellular network message center (MSC) data, and GPS location data.

In one example, the dashboard may be displayed on a display associated with the fourth data processing device, or on a further data processing device connected to the fourth data processing device.

Device Capabilities and Detection

The system may determine whether the second data processing device comprises a video capture device before the video stream is provided, for example, by means of the first, third or fourth data processing device. The system may determine whether the second data processing device comprises a video capture device, for example, by reading a browser configuration of the browser on the second data processing device or by requesting device and configuration data from the second data processing device.

The system may determine whether the second data processing device comprises video software or browser-based video telephony capabilities for providing the video stream before the video stream is provided. If the system determines that the second data processing device does not comprises video software or browser-based video telephony capabilities, a hyperlink may be provided by the system, for example in the browser of the second data processing device, by means of which the video software can be downloaded. For example, determining whether the second data processing device comprises video software or browser-based video telephony capabilities may be carried out by means of the first or third data processing device. The hyperlink may be provided by the first or third data processing device, on the vendor's website for example. Examples of video software are HTML5 based video applications. Webex, Whatsapp, Skype or FaceTime. In one example, video software or an application may be provided by the vendor or the system to download.

The system may determine, for example by the first data processing device or third data processing device, whether the second data processing device comprises an NFC reader to read the data from an electromagnetic chip of the identifying means, such as the embedded chip. If the system determines that there is an NFC reader associated with the second data processing device, the system may provide an onscreen, SMS or emailed hyperlink to the user, by means of which an NFC reader software or application can be downloaded. In one example, the hyperlink is provided by the first or third data processing device on the vendor's website.

The system may adapt, or partition, a video bandwidth of the live video stream to leave a data bandwidth free by transmitting control data from the first data processing device to the second data processing device to reconfigure one or more parameters of the video stream. For example, the system may determine an available bandwidth between the first data processing device and the second data processing device. The system may then determine an optimum size, resolution and frames per second of the video stream such that the video stream size in bytes/second does not exceed the available bandwidth, and where possible, is throttled to allow capacity for other services such as email, allow capacity for file transfer protocols to transfer data files in a timely manner to the second processing device, and/or provide some spare capacity to allow for bandwidth deviations and fluctuations.

One or more data links may be used and/or established for transmitting one or more image files, one or more data files and the video stream between the second data processing device and the first data processing device. The data links may be independent, and may comprise say https, TLS, SFTP, SMTP, multimedia messaging (MMS) services for transmission of images, and internet protocol links such as TLS or https for transmission of video signals or a combination of both, or other transmission technologies.

In one example, the second data processing device real time streams the video stream and sends the image data by a real time file transfer protocol. In one example, the second data processing device comprises a video recording device, an image capture or storage device, and/or an NFC reading device, and the second data processing device batch transfers the image(s) and/or data file(s) read by NFC at an opportune time according to bandwidth availability.

The system may adapt a video bandwidth of the live video stream by reducing the resolution of the video stream, reducing the size of the video stream, updating the video stream at a slower frame per second rate, or a combination of these during transmission of the image and/or data files, to allow for faster transmission of these files using remaining transmission bandwidth. In one example, the video stream may be paused during transmission of the image and/or data files.

Bluetooth, Wi-Fi or similar may be used to relay the video and/or the image data to a sixth data processing device which may include data buffering and transmission capabilities. The sixth data processing device may then transmit the image and/or video data to the first processing device.

The first data processing device and the second data processing device may communicate in a peer to peer arrangement.

The video capture device may be integrated in the second data processing device or may be coupled therewith. The video capture device may be, for example, a webcam or, a (digital) video camera. The image capture device may be a (digital) camera, for example. In one example the image capture device may include a biometric reader for fingerprints and/or a facial recognition device, as incorporated in the Apple Inc iPhone X. The digital camera of the image capture device may have more than one shutter and lens combination, which may be selected to act in concert to enhance the resolution, or, to capture images using different spectrum of light other than the normal visible spectrum. The digital camera may incorporate a 'fast lens' such that the shutter may be operated rapidly in order to capture high resolution still images in rapid succession, but may have a slower frame per second rate than the video capture device, which may operate at a lower resolution. The video capture device shutter and lens may be a separate shutter and lens, or the video capture device may utilise one of the 'fast lenses' operated at a faster frame rate that is suitable to video.

The camera apparatus may capture features on the identifying means that are discernable principally under ultraviolet, infra-red or other light spectra. These features on the identifying means are usually known as security features, and may be incorporated as part of a holographic image which may combine various security features with other visible elements.

The device to read the data from the embedded chip of the identifying means may be an NFC or radio frequency based reader device. For example, the embedded chip may comprises a radio frequency enabled chip, and the reader device may read data from the embedded chip when the reader device is proximate to the embedded chip.

The biometric features on the identifying means may be identified, captured and transmitted via one or more high resolution image captures, independent of the image capture of the image means and the video stream. The image capture may include a remote zoom function initiated by the agent or operator, the user or automatically by the system, or a combination of all three.

Non-Official Sources

In one example, the use of government documents or identification cards as the identifying means may be replaced or supplemented by non-official sources, such as utility bills, telephone, internet service or mobile phone monthly statements, council rates notices, tax return notices, national health insurance notices, bank statements, credit or debit card statements. Templates of these non-official sources may be uploaded to the database for reference by the first, second and/or fourth data processing device.

The system may optically determine unique features and map features based on the uploaded templates, in addition to identifying information that will appear on the non-official source. Such information may include due date, reference dates, name, address, mobile or telephone number, service provider name, service provider address, units of measurement including Kw, KW/h, L (litre), Kl, Mb, Gb, minutes, and/or currency, tax file identification number, person number, social security/medicare/national health insurance number and other unique characteristics relevant to the non-official source type. Examples of non-official sources may also include credit cards, debit cards, bank cards, and transport cards which contain NFC or radio frequency readable electronic chips. Information from these non-official sources may include a user's name, address, bank and account data.

Robot Agent

In one embodiment, the agent may be a robot agent, which may include artificial intelligence and/or machine learning and/or artificial neural networks in order to assist with the identification of layout, facial, fingerprint and signature features on documents, and comparing these with templates and stored images.

In another embodiment, the agent may be a combination of robot and human, where certain tasks are configured in advance to be performed by the human operator or assigned by the robot to the human operator.

Templates and Guidelines

The biometric features on the identifying means may be identified, captured and transmitted by the second data processing device via one or more high resolution image captures, independent of the identifying means image capture and the video stream. The image capture device may include a remote zoom function initiated by the operator, the user or automatically by the agent, or a combination of all three.

An identifying means incorporating biometrics features is captured by means of the image capture device, and the facial biometrics of the person are captured via the video recording device, in the second data processing device. An image file of the identifying means is transmitted by the second data processing device to the first data processing device. The first data processing device may display the image of the identifying means on a display device.

The system may automatically provide the user with instructions regarding certain positioning of the identifying means, so that the image of the identifying means is captured with sufficient accuracy by the image recording device. In one example, the system may display auxiliary lines on a display device coupled to the second data processing device to indicate the correct position of the identifying means. The system may also display a focus indicator. The auxiliary lines may be generated by the first data processing device and transmitted from the first data processing device to the second data processing device. In one example, the position of the auxiliary lines positions may be confirmed by the agent or remote operator (verifier), or the agent or remote operator may focus the auxiliary lines onto a certain feature, and the first or second data processing device may determine an optimal positioning of the auxiliary lines.

The auxiliary and focus lines may be generated by the second data processing device, and, in the case of a smartphone, may also be calibrated against standard templates of identifying means for comparison as to the format of the identifying means versus a known government identification document or non official document format. The identifying means template may be requested by the second data processing device from the first data processing device.

In a one embodiment, the system may calculate an angle between the auxiliary lines and an angle between lines on the identifying means. The system or second data processing device may detect whether principal lines located on the identifying means are within a preset angle of tolerance of being either parallel and/or orthogonal to the auxiliary lines, and where the principal lines are not within a preset angle of tolerance, the second data processing device may display an onscreen message or icon suggesting to the user that the image capture device be rotated clockwise or anticlockwise to provide better alignment. The system or second data processing device may also calculate a depth dimension of the view of the identifying means captured by the image capture device by comparing the size of the typescript fonts at the top and bottom of the identifying means, and, where font size is incrementally larger or smaller between side to side or top and bottom of the identifying means, the system or second data processing device may calculate an angle of deviation, and the user may be requested to adjust a horizontal or vertical angle of the image capture device. In one example, the focus of the image capture device may be automatically adjusted by the second or first data processing device, in order to achieve an optimal resolution of type script fonts on the identifying means for the purpose of optical character recognition.

The template requested may be based upon input from the user, whereby the user nominates the identifying means type in advance, by, for example, means of a web form. The identifying means is evaluated against templates for that document type.

The evaluation may include, for example, a check of the identifying means's authenticity against predetermined document template and format requirements and/or a positive check against a document validation service such as the Australian Document Validation Service and/or a negative check against Interpol's lost or stolen database, and/or a check of the authenticity of a signature on the document against a signature specifically requested from the user.

In one example, the system may evaluate the identifying means automatically by the first data processing device and/or second data processing device based on the image of the identifying means.

Dashboard Use

A check of the user's identity may be carried out on the basis of the identifying means. For example, the agent can compare the transmitted user data with the information on the identifying means. For this, the user data may be displayed on a screen mask in the dashboard, in a two-column form, for example. One column may contain the transmitted user data, and another column may initially empty. During the check of the identifying means, the reviewed and confirmed user data may be inserted in the other column via the dashboard to show that the check was successful.

A button may be provided by the system in the dashboard to transfer each data item. Empty fields may be highlighted, by means of a coloured marking, for example. Missing or incorrect data may be added as necessary by the agent or verifier. A third column may be displayed in the dashboard comprising information received from a fifth data processing device, whose function is described below.

In one example, the system or the verifier may compare a view of the user in the video stream with a photo on the identifying means or an image file read from an electromagnetic chip located within the identifying means. In one example, the system or the verifier may compare the view of the user with a photo of existing customers' stored on the fourth processing device or in the database.

In one example, the system or the verifier may compare the user's signature with a photo of the signature on identifying means or an image file read from an electromagnetic chip located within the identifying means. In one example, the system or the verifier may compare user's signature with photos of existing customers' signatures stored on the fourth processing device or in the database.

In one example, the system or the verifier may compare the user's fingerprints with a photo of the fingerprints on the identifying means or an image file read from an electromagnetic chip located within the identifying means. In one example, the system or the verifier may compare the user's signature with photos of existing customers' fingerprints stored on the fourth processing device or in the database.

The system may display in the dashboard a checklist listing points to be checked. The system may further provide images of security features of the identifying means in the dashboard to be checked by the operator (verifier) in order to check the authenticity of the identifying means. For example, security features may be in the form of watermarks and/or structural patterns.

The following information about the agent or operator may be stored in the database for use by the system: name of a call center, from which the operator operates, location, telephone number, name of the operator, an operator identification number, a call center identification number and any combination thereof. In one example, the system may automatically check features of the identifying means, for example, by means of the first data processing device.

Image Capture and Normalisation

The first data processing device may be configured to check security features of the identifying means. The system may capture and store an image of the identifying means as discussed above. Storage may be provided in the first data processing device, for example as intermediate storage, or in the database that is coupled to the fourth data processing device. The image may include one or more photographs of the inside the cover, front and/or back of the identifying means. The system may also capture and store an image of the user, if necessary, by means of the image capture device or the video recording device or both. In one example, the user's photo is located as a smaller image within the image of the identifying means, and the system extracts the user's photo from the identifying means and stores the user's photo as a separate image.

The system may extract the photo as part of a separate image capture focused on the photo of the user within the identifying means, or the system may utilise the entire photo of the identifying means and post process and extract the user's photo image the image of the identifying means, for example, at the first data processing device or the fourth data processing device. The system may normalise the image of the user and the photo image, for example according to size, colour intensity and/or orientation. The system may store the number of normalisation steps required for each image, for example, in the database. The system may also store the normalized image of the user and/or the normalized photo image in the database. In one example, an image of the user's signature, facial biometric features or fingerprint biometric features may have been captured separately from an electromagnetic chip of the identifying means. The system may store this image and use it to identify the user instead of, or as well as, the extracted photo image from the identifying means.

In some embodiments, the system may convert various images into an image with reduced colour, for example, a grey shaded or black-and-white image. For example, the background in the area around the head may be coloured white. The system may store the number of adjustment steps for the various images. Similarly, the system may store the converted image of the user and/or the converted photo image.

The system may use digital camera apparatus on the second data processing device. In one example, the system may use more than one lens of the digital camera apparatus. For example, the system may use more than one lens acting in concert to enhance the resolution or to capture images using different spectrum of light other than the normal visible spectrum. This may allow the system to further evaluate security features in the form of water-marks and/or structural patterns. The evaluation may be made by the first or second data processing device or a combination of both. The system may use digital camera apparatus that incorporate a 'fast lens' whereby the shutter is operated rapidly in order to capture high resolution still images in rapid succession, but at a slower frame per second rate than the lower resolution video capture. The system may capture features on the identifying means that are only discernable under ultraviolet, infra-red or other light spectra. These features are enhanced security features, and may be incorporated as part of a holographic image or as part of the construction of the identifying means.

The system may determine the following biometric parameters either individually or in any combination from available images (for example, each in original, normalized, and/or converted form): horizontal distance between tips of the ears, horizontal distance between outer corners of the of eyes, horizontal distance across the nostrils (width of the nose), horizontal outer distance of the neck (width of the neck), horizontal outer width of the face below the ears and horizontal distance between the extremities of the eyebrows. The system may compare the calculated distances with each other to check if they match between images. The system may consider the images identical if a threshold number of elements could, or could not, be determined (for example, because hair is covering the ears) and no element manifests a deviation greater than, for example, 5%. The system may adjust an acceptable deviation level dynamically, in a range from 1% to 20%, for example. This may enable different security requirements to be addressed. The system may also perform a similarity evaluation of the face shape and possibly other details.

The system may recognize and read data fields from the image of the identifying means by optical character recognition (OCR) by means of the first data processing device or second data processing device. The data fields read may be, for example, document type, a name (first name (s) and/or last name), a date of birth, a place of birth, a citizenship, an issue date or expiration date of the personal identification document, an identification number of the personal identification document, an access number, a signature, details of the issuing authority including country of issue and any combination thereof. The above data may be provided on the front of the identifying means, and may also be included in an optical machine readable zone (MRZ) and/or in an electromagnetic chip located within the identifying means. In one example, the following information may be collected by the first data processing device: an address (street, house number, city and/or postal code), an eye colour, height, a date of issue of the personal identification document, an issuing authority, and any combination thereof. This information may be supplied for example on either side of, or on multiple pages of, the identifying means.

The system may read at least part of a multi-line machine-readable area within, or on the front or back of an identifying means, using the image capture device associated with the first data processing device. The machine-readable areas may be captured by the system in whole or in part. For the machine-readable areas a non-proportional font is usually used. Each character has the same tracking. The symbol "<" is used instead of spaces. Each position in the machine readable zone is thus occupied by a character.

Official Documents

The first data processing device may be configured to recognize an any type of official government identity or license document, including passport, national ID, driver's license, shooters license, marine license, boat license, firearms license, or other official identity document, with or without photograph of the person.

The official government document may be compared by the system to a database of official documents, whereby templates, samples or typicals of the official government identity or license document are preloaded to the first data processing device, based upon information provided by the user such as country and document type. The image captured from the image capture device associated with the second data processing device may then be compared to the official government identity or license document samples by using the processing capabilities of the first data processing device. The template may be vector imaged in advance, or, may have been sampled for unique characteristics. The vectors or characteristics may be compared to the identifying means by the second data processing device, once it has been imaged, vectored and/or sampled by the system. The system may check the captured data by a format and/or a logic check, for example. The system may check for example that the date of birth appears in the format DD.MM.YY (D-day, M-month, Y-year). If an identifying means from a certain jurisdiction is checked by the system, the system may check that the nationality on the identifying means is that associated with that jurisdiction, and usually in the native language of the issuing country, and also either English, French or Spanish per international conventions for identification documents. In addition, the system may check foreign identity documents. For example, the system will allow only the nationality of the respective issuing country as a nationality on the document. The system may also check a check number on the identifying means.

An algorithm to form a checksum is known for German and Chinese identity cards, for example. The Chinese format includes the user's date of birth as part of the algorithm, which can be further checked against the data read from the face of the card. On the basis of the captured (either machine-readable or data on the face of the card or both) data, the system may check, for example, by means of the first data processing device, whether the checksum is correct. The system may compare a validity date read from the identifying means with a current date. The system may determine that the identifying means is invalid in the following cases: the identifying means has expired, the format and/or logic control lead to a negative result, the checksum is incorrect, more than three data fields cannot be read out. In one example, the system may determine that the identifying means is invalid when even one of the aforementioned cases occurs. The system may reevaluate the identifying means, if a previous evaluation was unsuccessful, for example, when data fields cannot be read. The reevaluation may be initiated by the agent, operator or automatically by the first data processing device.

Security features of an identifying means, such as an identity card or passport, may be captured and evaluated by means of the first data processing device. For example, an evaluation of the following security features may be provided: a structure in the background of a photo, a horizontal structure below the photo, a structure in a central region in a right edge of the identifying means, a structure in a top border (from the top edge to about 1.5 cm below) of the identifying means and any combination thereof. The above-mentioned security features may also be referred to as official security features. The security features may be evaluated for example by comparing them with stored, standard templates of the security features. A similarity evaluation of the captured security features with the stored standard templates may be performed by the system, for example, by comparing the security features with the templates. In one example, the system may only approve the identifying means for verification if most or all of the captured security features pass the comparison with the respective standard templates.

In one example, the first data processing device may capture and evaluate additional security features of an identifying means. The captured additional security features may be compared with stored reference values and features. The reference values and features may be stored in the database that is coupled with the fourth data processing device, for example. In one example, the additional security features may comprise the following features for an identifying means, such as an identity card or passport: distance from a bottom edge of the identifying means to a lower black line on a front of the identifying means, distance between two black lines on the front of the identifying means, distance from a top edge of the machine-readable zone to a bottom edge of the photo on the front of the identifying means, total height and/or total width of a printed area on the front of the identifying means, distance from a right edge to a beginning of the printed area on the back of the identifying means, distance from the bottom edge to a beginning of text of a surname on the identifying means, distance between the surname and the date of issue on the back of the identifying means, and any combination thereof. The system may determine that the security features are valid if, for example, at least some of the aforementioned additional security features could be determined, and the deviation when compared with the respective reference values is less than a preset tolerance, for example 5% in each case. Provision may also be made for dynamic adjustment of the deviation. In one example, the features of identifying means, such as identity cards or passports, may be compared against known standards published by the International Civil Aviation Organization, Governments or other standard setting bodies.

In one example, the additional security features may include the following: distance from the bottom edge of the identifying means to the beginning of the bottom edge of the printed photo on the front of the identifying means, distance from the top edge of the identifying means to the beginning of an ID number on the front of the identifying means, distance from the top edge of the identifying means to the top edge of the photo on the front of the identifying means, the total height and/or total width of the printed area on the front of the identifying means, distance between the left edge of the identifying means and the beginning of the printed area on the back of the identifying means, distance between the bottom edge of the identifying means and the beginning of the machine-readable zone on the identifying means, height of the machine-readable zone on the back of the identifying means, total width of the machine-readable zone on the back of the identifying means, and any combination thereof. The automatic comparison may be considered successful for example if at least a predetermined number, for example six, of the aforementioned further security features could be determined, and the deviation when compared with the respective reference values is less than a preset tolerance value, for example 5%, in each case. In one example, the operator (verifier) may determine the predetermined number and/or the preset tolerance value. In one example, the preset tolerance value and/or the predetermined number may be adjusted dynamically by the operator of the dashboard.

In one example, the security features and/or additional security features may be checked by the operator, the system or by software running on the second data processing device. The system, agent or operator may then instruct the user in how to hold the personal identification document (for example, the identity card) in front of the video recording device so that a check of the security features and/or additional security features by the first data processing device is made possible, and/or the operator, agent or the system can verify the security features and/or additional security features.

Databases

In one embodiment, the user data is transmitted to a fifth data processing device, for example, by the first data processing device. The fifth data processing device then checks whether at least some of the user data is contained in a further database coupled to the fifth data processing device. Examples of databases that may be referenced by the fifth data processing device include credit reference databases, electoral roll register databases, mobile phone ownership registers, telephone indexes such as the Whitepages, mortality databases, immigration and visa databases, local council residential registers, Government document validation services such as the Chinese Police National ID check or the Australian Document Validation Service (DVS), social media databases, Interpol's or a law enforcement database of lost or stolen documents and/or bankID registers. The fifth data processing device may transmit the information regarding whether or not the user data is contained in a further database to the first data processing device as the result of the check.

If the evaluation of the personal identification document has been completed successfully, that is to say the user's identity has been verified, the system may include the user in the database as an existing customer. For example, the user's data may be stored in the database, optionally together with a customer identification number assigned to the user. In one example, the user data and/or data from the evaluation of the identifying means may be transmitted by the first data processing device to the fourth data processing device in encrypted and/or compressed form.

The transmitted data may be converted by the fourth data processing device into a format that is not readable in plain text. The user data and/or data from the evaluation of the identifying means may also be transmitted by the first data processing device to the third transmitted processing device in encrypted and/or compressed form. The data may be transmitted in each case by means of POST BASE64 string, for example.

In one example, the system may send an electronic message to the user via an onscreen alert on the browser, alert within a running application, an iOS or Android notification, e-mail, MMS and/or SMS, for example, informing the user that the identification verification has been successful.

After the user has been successfully checked and/or identified by the system and/or the verifier, a corresponding message may be transmitted by the system to the third data processing device (to the vendor's website, for example), optionally together with the operation identification number. The user can then perform further actions, such as concluding a contract. In one example, the system may transmit a transaction number (TAN) by SMS, email, notification or onscreen to the successfully checked new user. After entering and examining the TAN, the user can perform other actions. Further details on the TAN are listed in the following. For successfully checked new customers, the user data may be matched by the system with existing user data in the database, and the user may be confirmed by the system as being the same user by transmission of a TAN by SMS or secure transmission to an application on a device previously associated with the user. In one example, a customer identification number may be assigned to each existing customer, and the user may be requested to provide the customer identification number. When the user enters their customer identification number, a check may be run by the system to determine whether the user is already stored in the database. After the user data and/or customer identification number has been matched successfully, a transaction number (TAN) is transmitted to the user, for example via an onscreen alert on the browser, alert within a running application, an iOS or Android notification, e-mail, SMS and/or voice announcement over telephone. The TAN is stored in the database, optionally together with the assigned operation identification number.

After the TAN is entered on the vendor's website, a check as to whether the TAN entered matches the stored TAN is carried out. If the result of this check is positive, the user is recognized as an existing customer and can immediately undertake further actions on the website. It may be provided that a button is displayed on the vendor's web site, which the user can click to indicate that he is an existing customer. This then leads directly to the check of user data. In one example, the system may automatically determine whether the user is an existing customer, for example on the basis of the entered user data, particularly with reference to the e-mail address.

The TAN may be generated by the fourth data processing device, as a multi-digit alpha numeric or numeric only string, for example. In one example, the TAN is only valid for a limited time, for example up to one hour after its generation. This may be checked as necessary when the TAN is entered. In one example, the user has only a limited number of attempts to enter the TAN. The entry of a non-matching TAN (for example because of typing errors) may be limited to three attempts. For example, the fourth data processing device may be configured to count and check the number of times the TAN has been input. The fourth data processing device may also perform a logic test of the TAN, to determine whether the TAN has a specific format, for example. The system may also check whether there is an operation identification number associated with the TAN. In one example, the system may delete the TAN from the database after successful input.

The vendor's data may also be stored by the system in the database. The vendor data may include the following information: first name, last name, company name, address (street, house number, postal code, city), country, a vendor identification number, a date of application and/or any combination thereof. A comment indicating details of any contractual relationship that exists between the vendor and the provider of the system may also be stored. For example, a vendor identification number may be assigned by the system to user data that is transmitted to the third data processing device.

The system may evaluate a signature on the identifying means. For this purpose, the signature may be captured by the image capture device and/or the video recording device. The first data processing device may be configured to compare the captured signature with signatures stored in the database and/or against the signature on the identifying means to determine a match. For the match, a similarity relation may be used by the system, which indicates how large the deviation between the captured and the stored signature may be, and still allow that the signatures are the same. The signature on an identifying means of which an image is stored in the database, may be used as a stored signature, for example.

The methods and actions described herein may be carried out by one or more data processing devices. It will be appreciated that actions performed by the system may be carried out by any suitable one, or combination of, the data processing devices. One or more actions described here may be carried out by an app or other software that is downloadable to, and executable on, the second data processing device. Each data processing device may have for example one or more processors and storage capacity with one volatile (e.g. RAM) and/or one non-volatile (e.g. hard disk) memory.

The data processing devices may also each comprise communication means for receiving and/or transmitting data and/or data streams, such as a Local Area Network (LAN) connection, a Wireless Local Area Network (WLAN) connection, a Universal Serial Bus (USB) port, a Bluetooth adapter and/or a Firewire port (IEEE 1394). The data processing devices may each comprise a device for capturing a user input, such as a keyboard, a mouse and/or a touchpad. The data processing devices may each be connected to a display device. Alternatively, a display device may be integrated in each of the data processing devices. The display device may include a touch-sensitive screen for capturing a user input. The data processing devices may each be configured as a server, web server, personal computer, laptop, tablet PC or smartphone, for example.

Figure 11:
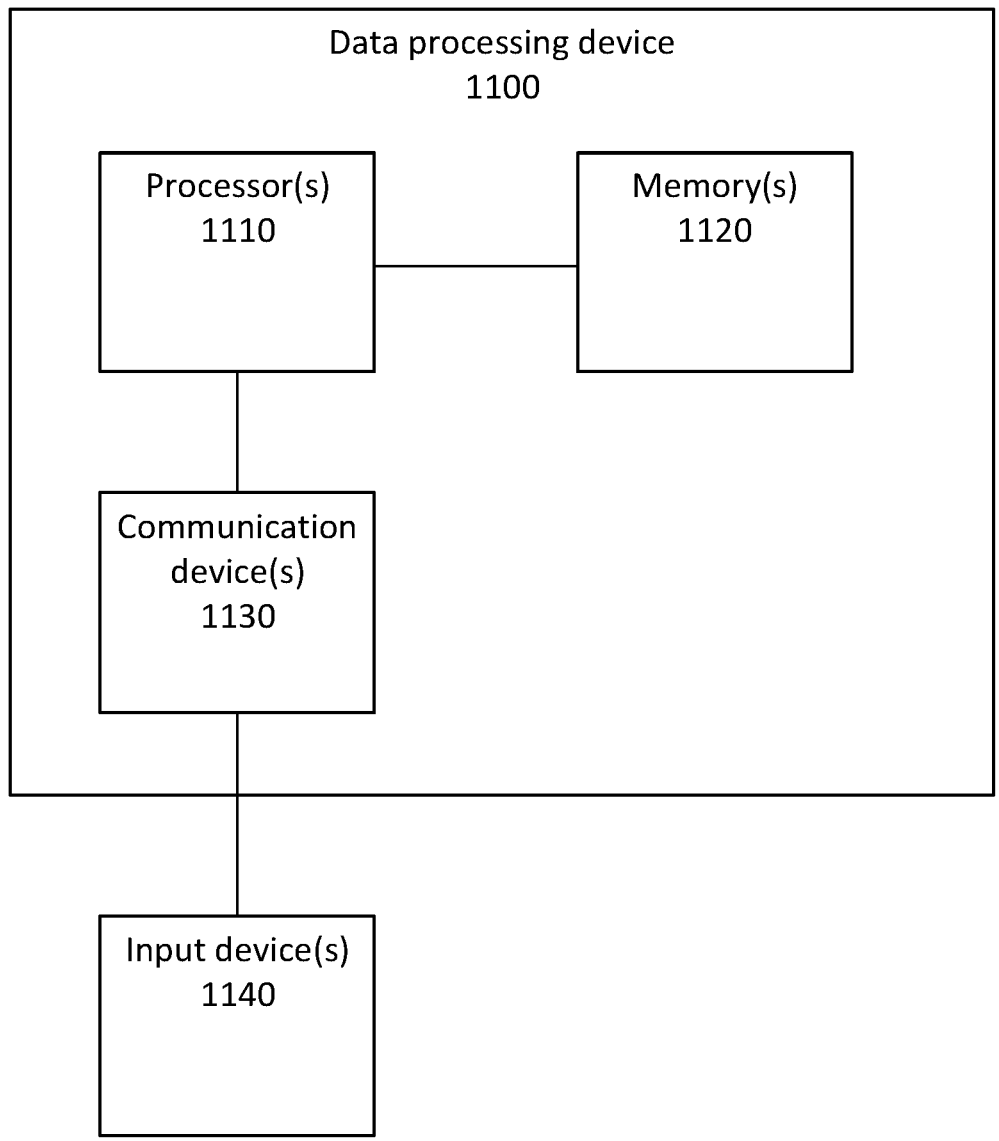
FIG. 11 illustrates an example data processing device.

FIG. 11 illustrates an example data processing device 1100 that may be used as one or more of the data processing devices in the system discussed above. The data processing device 1100 comprises one or more processors 1110 to execute computer program code, for example, to perform methods and actions discussed herein. The data processing device 1100 comprises one or more memories 1120 to store data and computer program code. For example, the one or more memories may store images, videos, user data and/or the database described herein. The data processing device 1100 comprises one or more communication devices 1130 to connect to other data processing devices, for example, via a network such as the Internet, and/or to input device(s) 1140, such a keyboard, a mouse, a trackpad, a video capture device, an image capture device and/or a fingerprint reader.

Figure 12:
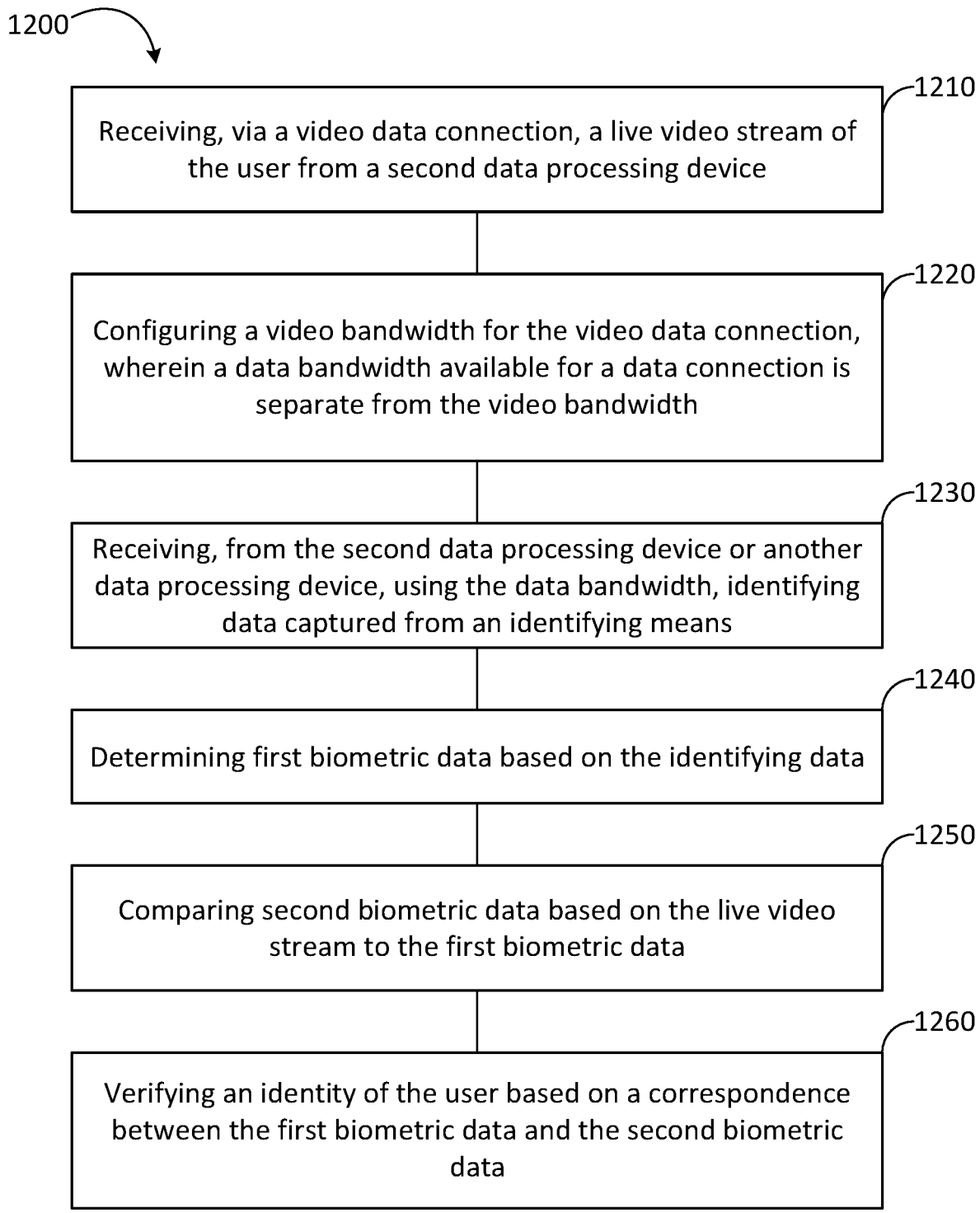
FIG. 12 illustrates another example computer-implemented method for remotely verifying an identity of a user.

FIG. 12 illustrates a computer-implemented method 1200 for remotely verifying an identity of a user. For example, the method 1200 may be implemented by the first data processing device 120 in the system 100 to verify an identity of the user.

At step 1210, the method 1200 comprises receiving, via a video data connection 108, a live video stream of the user from a second data processing device.

At step 1220, the method 1200 comprises configuring a video bandwidth for the video data connection 108, wherein a data bandwidth available for a data connection 110 is separate from the video bandwidth. The video bandwidth may be configured to avoid interruption of the video stream and/or to leave a bandwidth free for other data to be transmitted, as discussed in the description above.

At step 1230, the method 1200 comprises receiving, from the second data processing device or another data processing device, using the data bandwidth, identifying data captured from an identifying means. For example, the second data processing device may transmit the identifying data on the same or a different link to the video stream. In one embodiment, the video stream may be received by the first data processing device from a second data processing device and the identifying data may be received from the other processing device. For example, the second data processing device and/or the other data processing device may be associated with the user, associated with the system, or associated with a third party.

In one example, the user commences the verification process from a personal computer being the second data processing device, and the system sends an short message service (SMS) message comprising a hyperlink to a smart phone (being the other data processing device) that is, for example, registered or nominated by the user. The smart phone (with suitable camera) may then be used by the user to photograph the identifying means, and may transmit identifying data to the first data processing device.

In one example, the first processing device may receive data from the user comprising a user location, and a drone (autonomous or piloted) with one or more camera device(s) is sent to the location. The location may be, for example, coordinates, a postal address, or other location information such as that provided by many mobile computing devices. The drone may be, for example, remotely piloted or autonomous. The drone is network connected and may alert the user via email, SMS or other means that it is arriving at the location. The drone may hover at the user's location and initiate the live video stream. The first processing device may receive the live video stream from the drone. The drone may also use its camera to log or transmit other information to the first data processing device, such as geo-coordinates and/or an exterior of a residence where the user is located. The drone may also capture the identifying data and transmit it to the first data processing device, or the identifying data may be captured by another data processing device, such as a personal computing device of the user. For example, the drone may use one of its multiple cameras to photograph documents being held by the user.

At step 1240, the method 1200 comprises determining first biometric data based on the identifying data, for example, as discussed in the description above.

At step 1250, the method 1200 comprises comparing second biometric data based on the live video stream to the first biometric data, for example, as discussed in the description above.

At step 1260, the method 1200 comprises verifying an identity of the user based on a correspondence between the first biometric data and the second biometric data, for example, as discussed in the description above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for remotely verifying an identity of a user, the method comprising:
   receiving, at a first data processing device via a video data connection, a live video stream of the user from a second data processing device, the video data connection having a video bandwidth;
   establishing a separate data connection between the first data processing device and the second data processing device, wherein the data connection has a data bandwidth, and wherein establishing the separate data connection comprises partitioning the video bandwidth to leave the data bandwidth free by transmitting control data from the first data processing device to the second data processing device to reconfigure one or more parameters of the live video stream;
   receiving, at the first data processing device from the second data processing device, or another data processing device, using the data bandwidth, identifying data captured from an identifying means;
   determining, by the first data processing device, first biometric data based on the identifying data;
   comparing, by the first data processing device, second biometric data based on the live video stream to the first biometric data; and
   verifying an identity of the user, by the first data processing device, based on a correspondence between the first biometric data and the second biometric data.

2. The method of claim 1, wherein the live video stream of the user received at the first data processing device persists throughout the receiving of the identifying data.

3. The method of claim 1, wherein the live video stream of the user received at the first data processing device is displayed on a display for a verifier to review.

4. The method of claim 1, wherein the identifying data is captured by the second data processing device from the identifying means and is received by the first processing device from the second data processing device using the data bandwidth.

5. The method of claim 1, wherein the video bandwidth is partitioned based on one or more of the following:
   a detected bandwidth between the second data processing device and the first data processing device;
   a bandwidth needed for the data connection; and
   a detected level of fluctuation in the bandwidth between the second data processing device and the first data processing device.

6. The method of claim 1, wherein the control data controls a focal length of a video capture device, associated with the second data processing device, that captures the real-time video stream.

7. The method of claim 1, wherein the one or more parameters of the live video stream are reconfigured to reduce a bit rate of the live video stream or to enhance the second biometric data of the user in the live video stream.

8. The method of claim 1, wherein the identity of the user is verified when the correspondence between the first biometric data and the second biometric data is greater than a threshold correspondence.

9. The method of claim 1, further comprising:
   assigning an operation identification number to the identifying data; and
   storing the identifying data in a database with the assigned operation identification number.

10. The method of claim 9, further comprising:
    comparing the identifying data to previously stored identifying data in the database;
    determining a match between the identifying data and one or more items of previously stored identifying data; and
    associating the identifying data with an operation identification number assigned to the one or more items of previously stored identifying data.

11. The method of claim 1, wherein the identifying data is captured using one or more of the following:
    an image capture device associated with second processing device; and
    a near field communication device associated with second processing device.

12. The method of claim 11, further comprising:
    detecting an identifying means in an image stream captured using the image capture device by comparing the image stream against an identifying means template;
    wherein detecting the identifying means in the image stream captured using the image capture device comprises identifying one or more of the following features in the image stream:
    security features;
    photographs;
    issuer data; and
    biodata.

13. The method of claim 12, wherein capturing identifying data comprises capturing an image of the identifying means when the identifying means is detected in the image stream captured using the image capture device.

14. The method of claim 12, further comprising:
extracting the first biometric data from the image stream based on fields defined by the identifying means template.

15. The method of claim 12, further comprising:
extracting user detail data from the image stream by optical character recognition based on the fields defined by the identifying means template.

16. The method of claim 11, wherein capturing the identifying data comprises capturing data from an embedded chip of the identifying means by the near field communication (NFC) device associated with the second data processing device.

17. A data processing device for remotely verifying an identity of a user, the device comprising:
a processor configured to:
receive a live video stream of the user from a second data processing device via a video data connection, the video data connection having a video bandwidth;
establish a separate data connection to the second data processing device, wherein the data connection has a data bandwidth, by partitioning the video bandwidth to leave the data bandwidth free by transmitting control data to the second data processing device to reconfigure one or more parameters of the live video stream;
receive identifying data from the second data processing device via the data connection having the data bandwidth, wherein the identifying data was captured from an identifying means;
determine first biometric data based on the identifying data;
compare second biometric data based on the live video stream to the first biometric data; and
verify an identity of the user based on a correspondence between the first biometric data and the second biometric data.

18. A system for remotely verifying an identity of a user, the device comprising:
a second data processing device having a processor configured to:
transmit a live video stream of the user via a video data connection, the video data connection having a video bandwidth;
transmit identifying data captured from an identifying means via a data connection having a data bandwidth, wherein the identifying data is captured from an identifying means;
a first data processing device having a processor configured to:
receive the live video stream of the user from the second data processing device;
establish a separate data connection to the second data processing device, wherein the data connection has the data bandwidth, by partitioning the video bandwidth to leave the data bandwidth free by transmitting control data to the second data processing device to reconfigure one or more parameters of the live video stream;
receive the identifying data from the second data processing device using the data bandwidth;
determine first biometric data based on the identifying data;
compare second biometric data based on the live video stream to the first biometric data; and
verify an identity of the user based on a correspondence between the first biometric data and the second biometric data.

19. A non-transitory computer readable medium including computer-executable instructions stored thereon, that when executed by a processor causes the processor to perform the method of claim 1.

* * * * *